(12) United States Patent
Obara et al.

(10) Patent No.: US 8,090,804 B2
(45) Date of Patent: Jan. 3, 2012

(54) AUTOMATIC SERVICE APPARATUS AND AUTOMATIC SERVICE SYSTEM

(75) Inventors: Tomomichi Obara, Maebashi (JP);
Yasutaka Ishikawa, Maebashi (JP);
Satoshi Tomi, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 1489 days.

(21) Appl. No.: 11/103,450

(22) Filed: Apr. 12, 2005

(65) Prior Publication Data
US 2006/0036711 A1 Feb. 16, 2006

(30) Foreign Application Priority Data

Jul. 15, 2004 (JP) ................................ 2004-208940

(51) Int. Cl.
*G06F 15/16* (2006.01)
*G06F 15/177* (2006.01)
*G07F 19/00* (2006.01)
*G06F 3/00* (2006.01)

(52) U.S. Cl. ......... 709/220; 709/219; 235/379; 715/749

(58) Field of Classification Search .................. 709/218, 709/219, 223, 220; 705/43; 235/379; 715/749, 715/764, 864
See application file for complete search history.

(56) References Cited

U.S. PATENT DOCUMENTS

| | | | |
|---|---|---|---|
| 6,539,361 B1* | 3/2003 | Richards et al. | 705/35 |
| 6,901,382 B1* | 5/2005 | Richards et al. | 705/35 |
| 7,025,255 B1* | 4/2006 | Drummond et al. | 235/379 |
| 2005/0109831 A1 | 5/2005 | Obara et al. | |

FOREIGN PATENT DOCUMENTS

| | | |
|---|---|---|
| JP | 2000-298752 | 10/2000 |
| JP | 2001-249895 | 9/2001 |
| JP | 2005-157427 | 6/2005 |

OTHER PUBLICATIONS

Japanese Office Action mailed Jun. 30, 2009 and issued in corresponding Japanese Patent Application 2004-208940.

* cited by examiner

*Primary Examiner* — Brian J Gillis
(74) *Attorney, Agent, or Firm* — Staas & Halsey LLP

(57) ABSTRACT

An automatic transaction system communicates with a Web server and performs automatic transaction according to the operation of a user. In order to decrease the download time with the Web server which is generated for each operation of the user, a screen frame of a browser of an automatic service device is divided into a transaction screen frame and an applet resident frame. And all applets are embedded in a screen content of the Web server, and are downloaded into the applet resident frame of the browser in advance when the device is started up. And in the subsequent Web communication, a method callup script is embedded in the image content, and a method of an applet of the resident frame is called up and the operation of I/O units are controlled.

21 Claims, 27 Drawing Sheets

FIG. 6

| COMMAND TYPE | COMMAND |
|---|---|
| CRW COMMAND | CARD INSERTION |
| | CARD EJECT |
| RPR COMMAND | PRINT |
| | RELEASE |
| PPR COMMAND | PASSBOOK INSERTION |
| | PRINT |
| | MS WRITE |
| | PASSBOOK EJECT |
| | AUTO TURN PAGE |
| BRU COMMAND (CRU COMMAND) | INITIALIZATION |
| | ACCEPTANCE/COUNTING |
| | STORE |
| | DEPOSIT RETURN |
| | FEED |
| | RELEASE |
| | CAPTURE |
| | TRANSPORT PATH CHECK |
| | JAM RESET |

FIG. 7

| AGENT | METHOD | | IO CONTROLLER | | | | | | | | |
|---|---|---|---|---|---|---|---|---|---|---|---|
| | | NONE | BILL | COIN | PASSBOOK | CARD | RECEIPT | JOURNAL | TRANSACTION | TEN KEY |
| SYNCHRONIZATION | INITIALIZE | | ● | ● | ● | ● | ● | ● | ● | ● |
| | MECHANISM RESET | | ● | ● | ● | ● | ● | ● | | |
| | BILL/COIN INSERT | | ● | ● | | | | | | |
| | MEDIUM SIMULTANEOUS EJECT | | ● | ● | ● | ● | ● | | | |
| | PRINT/FEED/MS WRITE/EJECT PREPARE | | ● | ● | ● | ● | ● | ● | | |
| | DEPOSIT RETURN | | ● | ● | | | | | | |
| | STORAGE | | ● | ● | | | | | | |
| | FORCE-EJECT/CAPTURE | | ● | ● | ● | ● | ● | | | |
| | OBTAIN UNIT INFORMATION/SET TRANSACTION | | ● | ● | ● | ● | ● | ● | ● | ● |
| | STATUS/TWO-SCREEN DISPLAY | | ● | ● | | | | | | |
| | DEPOSIT/WITHDRAWAL PREPARE | | ● | ● | | | | | | |
| | FORCE REPLENISH | | ● | ● | | | | | | |
| | JAM RESET | | | | ● | ● | | | | |
| | CARD/PASSBOOK INSERT | | | | ● | ● | | | | |
| POST | POST PROCESS | ● | | | | | | | | |
| | POST DATA HOLD | ● | | | | | | | | |
| TEXT DISPLAY | FONT SET | ● | | | | | | | | |
| | TEXT DISPLAY | ● | | | | | | | | |
| | TEXT ERASE | ● | | | | | | | | |

FIG. 8

| AGENT | METHOD | IO CONTROLLER | | | | | | | | |
|---|---|---|---|---|---|---|---|---|---|---|
| | | NONE | BILL | COIN | PASBOOK | CARD | RECEIPT | JOURNAL | TRANSACTION | TEN KEY |
| BILL CONTROL | RECEIPT/COUNTING | | ● | | | | | | | |
| | STORAGE | | ● | | | | | | | |
| | DEPOSIT RETURN | | ● | | | | | | | |
| | RELEASE | | ● | | | | | | | |
| | CANCEL | | ● | | | | | | | |
| PASSBOOK CONTROL | PRINT LINE SET/PAGE MARK READ | | | | ● | | | | | |
| | MS READ | | | | ● | | | | | |
| | AUTO TURN PAGE | | | | ● | | | | | |
| | PAGE CHECK AUTO TURN | | | | ● | | | | | |
| | SET PASSBOOK TYPE INFORMATION | | | | ● | | | | | |
| CARD CONTROL | CARD INSERT | | | | | ● | | | | |
| | CANCEL | | | | | ● | | | | |
| | MONEY TRANSFER CARD PRINT | | | | | ● | | | | |
| | MONEY TRANSFER CARD ISSUE | | | | | ● | | | | |
| | EJECT PREPARE | | | | | ● | | | | |
| RECEIPT CONTROL | REGISTER OVERLAY | | | | | | ● | | | |
| | EJECT PREPARE | | | | | | ● | | | |
| TRANSACTION CONTROL | SET TRANSACTION INFORMATION | | | | | | | | ● | |
| | MONITOR DEVICE STATUS | | | | | | | | ● | |
| | OBTAIN DEVICE STATUS | | | | | | | | ● | |
| | SET OSPERATION INFORMATION | | | | | | | | ● | |
| | CANCEL | | | | | | | | ● | |
| TEN KEY | TEN KEY INPUT START | | | | | | | | | ● |
| | TEN KEY INPUT END | | | | | | | | | ● |

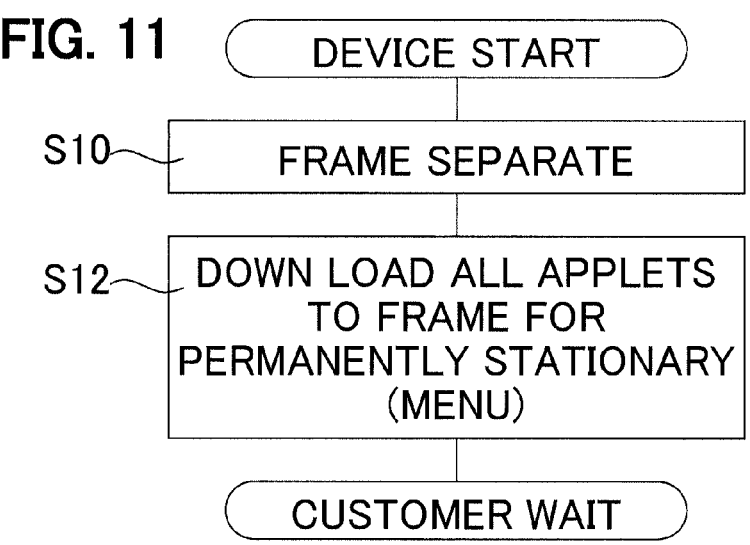

FIG. 12
U_agtMain.htm    Page 1

```
1  <HTML>
2  <HEAD>
3  <META HTTP-EQUIV="Content-Type" Content="text/html ; charset=x-sjis">
4  <TITLE>WebATM Agent Test Page V01L07Lebel </TITLE>
5  </HEAD>
6  <FRAMESET COLS="0%, 100%" frameborder="0">
7    <FRAME SRC="U_agtMenu_htm" NAME="menu">        ⎫
8    <FRAME SRC="U_agtSubMain_htm" NAME="submain">  ⎬ FRAME SEPARATE
9  </FRAMESET>                                      ⎭
10 </HTML>
```

FIG. 13

```
<applet code="agtSync.U_agtSync_initial.class" archive="./Agent.jar" codebase="./" width="0" height="0"
name="U_agtSync_initial">
</applet>
```

......

```
<applet code=
</applet>
```

```
<HTML>
<HEAD>
<META http-equiv="Content-Type" content="text/html; charset=shift_jis">
<TITLE>WebATM Sample</TITLE>
</HEAD>
<BODY background="http://webatm:8080/webatm/xxx.bmp">
```
⎫ 122-1 parent.frame2.document.U_agtPost.registerFrame(strFrameName) ⎯⎯ 122-2

```
<SCRIPT language="javascript">
<!--
    //DEFINE CALLED FUNCTION FROM POSTAgent (NECESSARY)
    function postFunc(postData){
        document.sys_form.ioResponse.value = postData;
        window.document.sys_form.submit();
    }
```
⎬ 122-3a

```
//-->
</SCRIPT>
<FORM name="sys_form" method="post" action="http://webatm:8080/webatm/main.jsp">
    ~OMIT~
    <font size=10>PLEASE WAIT</font>
    <BR>
    <HR>
</FORM>
```
⎬ 122-3b

```
<SCRIPT language="javascript">
<!--
    //CALL ControlAgent
    ret = parent.frame2.document.U_agtSync_initial.initial(parseInt(initialMode),
                                                          parseInt(pmode),
                                                          parseInt(document.initial.in_enforced.value));
```
⎬ 122-3c

```
    // ABNORMAL NOTIFY PROCESS
        ~OMIT~
    }
//-->
</SCRIPT>
</BODY>
</HTML>
```
⎬ 122-4

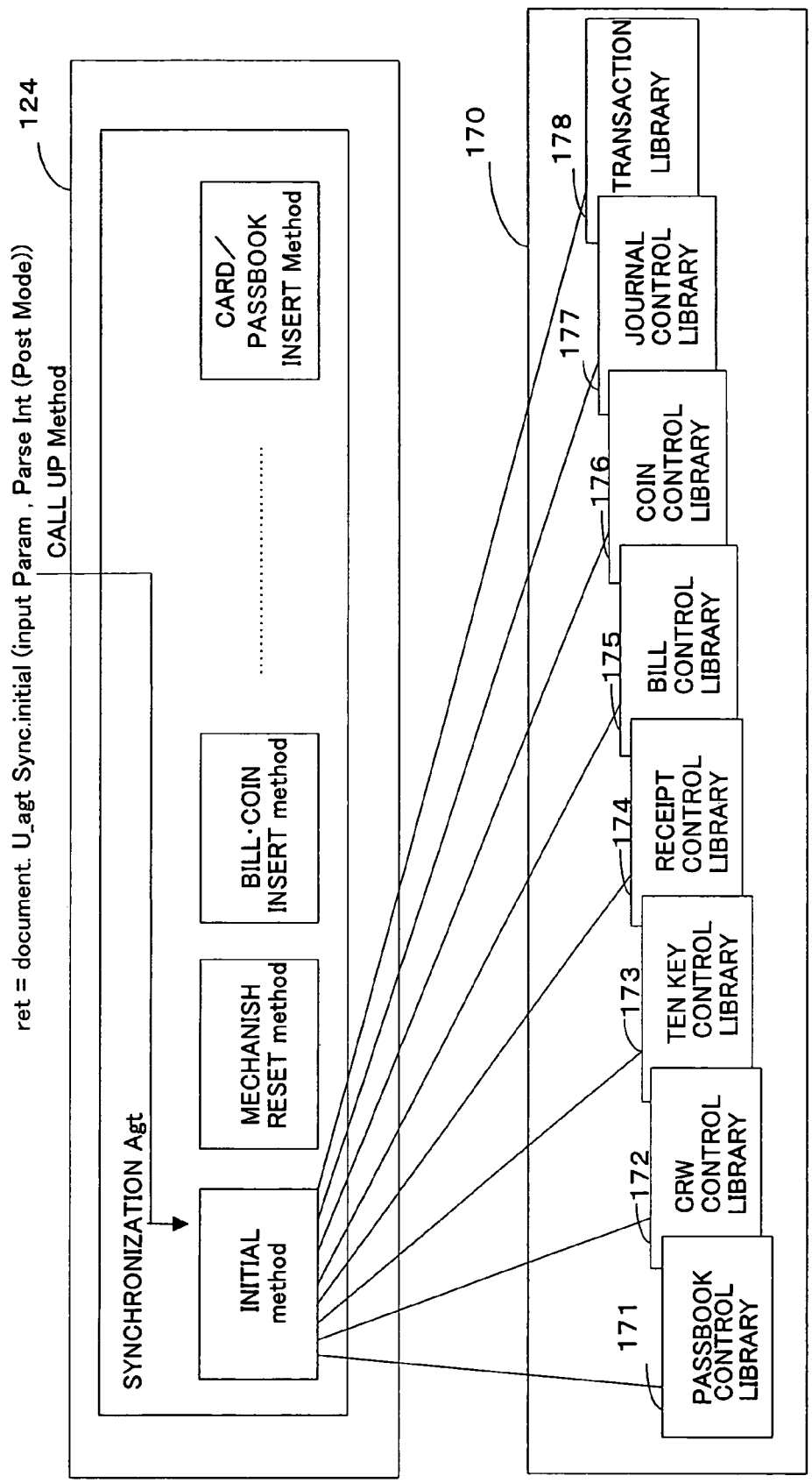

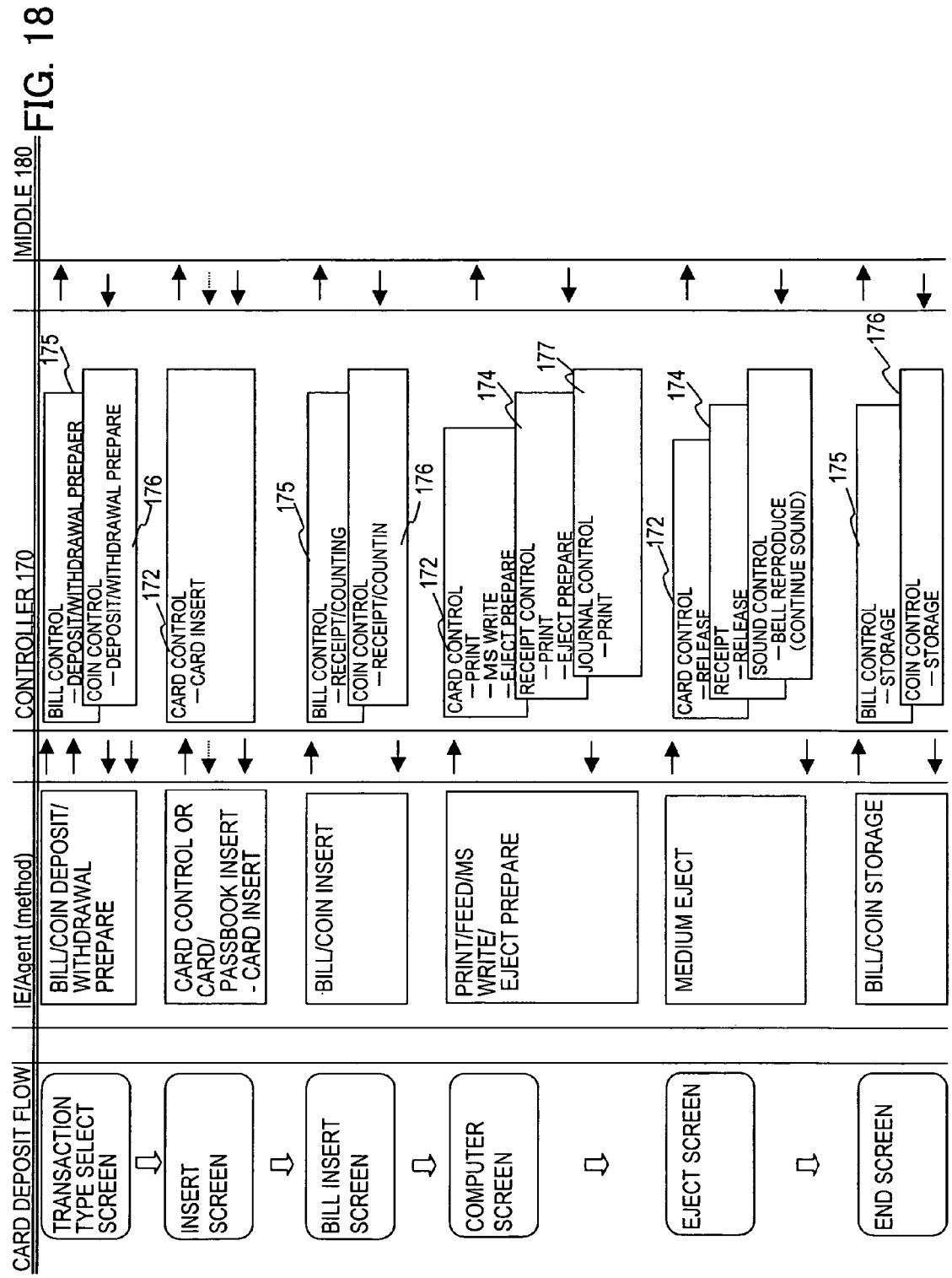

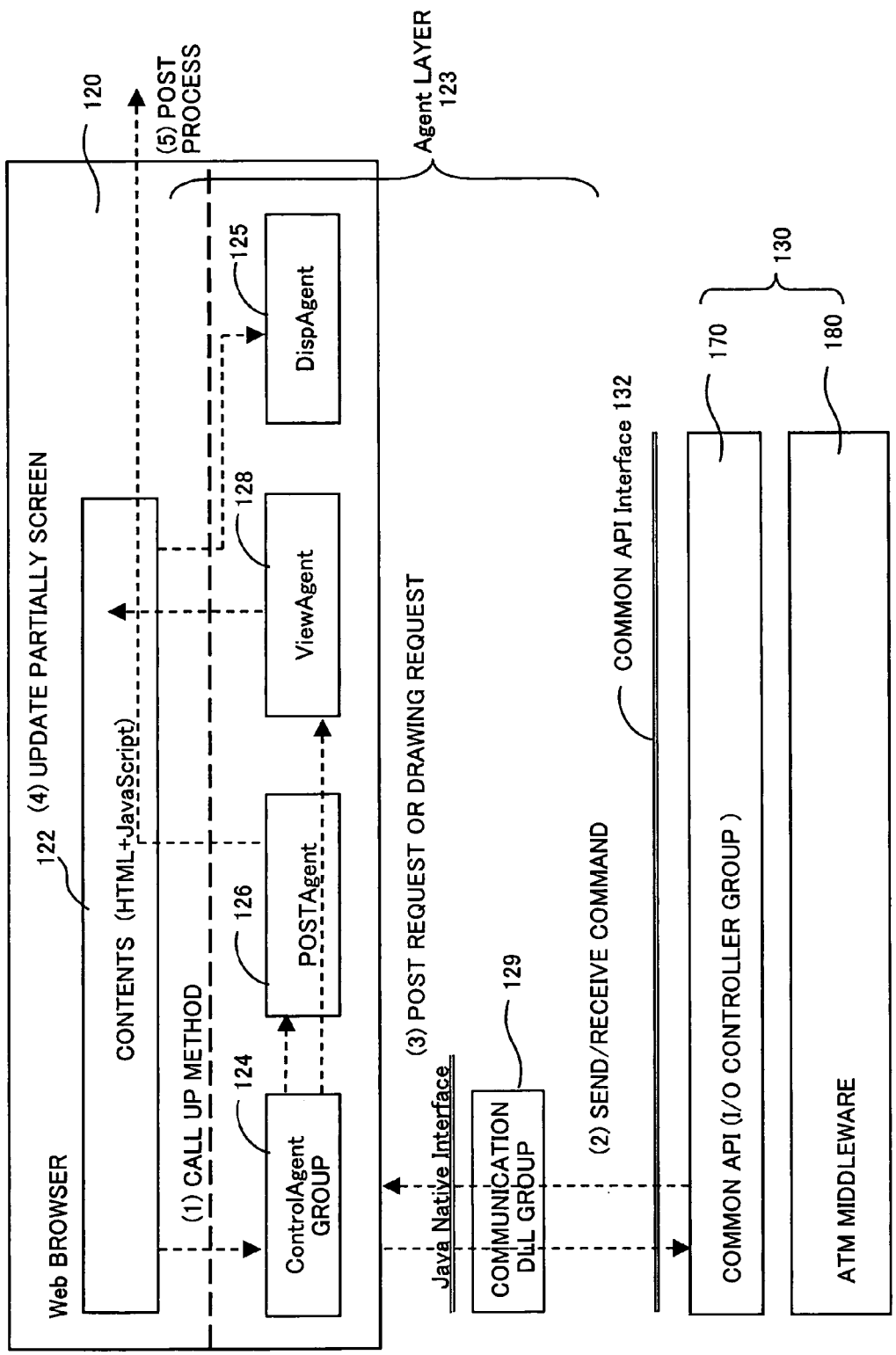

FIG. 21

| AGENT | METHOD | IO CONTROLLER | | | | | | | | |
|---|---|---|---|---|---|---|---|---|---|---|
| | | NONE | BILL | COIN | PAS BOOK | CARD | RECEIPT | JOURNAL | TRANS- ACTION | TEN KEY |
| SYNCHRONIZATION | INITIALIZE | | ● | ● | ● | ● | ● | ● | ● | ● |
| | MECHANISM RESET | | ● | ● | ● | ● | ● | ● | | |
| | BILL/COIN INSERT | | ● | ● | | | | | | |
| | MEDIUM SIMULTANEOUS EJECT | | ● | ● | ● | ● | ● | | | |
| | PRINT/FEED/MS WRITE/EJECT PREPARE | | ● | ● | ● | ● | ● | ● | | |
| | DEPOSIT RETURN | | ● | ● | | | | | | |
| | STORAGE | | ● | ● | ● | ● | ● | | | |
| | FORCE-EJECT/CAPTURE | | | | | | | | | |
| | OBTAIN UNIT INFORMATION/SET TRANSACTION STATUS/TWO-SCREEN DISPLAY | | ● | ● | ● | ● | ● | ● | ● | ● |
| | DEPOSIT/WITHDRAWAL PREPARE | | ● | ● | | | | | | |
| | FORCE REPLENISH | | ● | ● | | | | | | |
| | JAM RESET | | ● | ● | | | | | | |
| | CARD/PASSBOOK INSERT | | | | ● | ● | | | | |
| POST | POST PROCESS | ● | | | | | | | | |
| | POST DATA HOLD | ● | | | | | | | | |
| TEXT DISPLAY | FONT SET | ● | | | | | | | | |
| | TEXT DISPLAY | ● | | | | | | | | |
| | TEXT ERASE | ● | | | | | | | | |
| SCREEN CONTROL (KEY CONTROL) | PASSWORD INPUT | ● | | | | | | | | |
| | AMOUNT INPUT | ● | | | | | | | | |
| | TELEPHONE NO. INPUT | ● | | | | | | | | |
| | ACCOUNT NO. INPUT | ● | | | | | | | | |
| | REQUEST PERSON NAME/RECEIVE PERSON INPUT | ● | | | | ● | | | | |

```
<applet code="agtDisp.U_agtDisp_inputName.class" archive="./Agent.jar"
    codebase="./" width="0" height="0" name="U_agtDisp_inputName" MAYSCRIPT>
<PARAM NAME="strPatternNo" VALUE="1">
<PARAM NAME="strTimer" VALUE="0">
<PARAM NAME="strFastMode" VALUE="2">
</applet>
```

FIG. 24

```
<applet code="agtDisp.U_agtDisp_inputName.class" archive="./Agent.jar"
    codebase="./" width="800" height="600" name="U_agtDisp_inputName" MAYSCRIPT>
<PARAM NAME="strPatternNo" VALUE="1">
<PARAM NAME="strTimer" VALUE="0">
<PARAM NAME="strFastMode" VALUE="1">

</applet>
```

AUTOMATIC SERVICE APPARATUS AND AUTOMATIC SERVICE SYSTEM

CROSS-REFERENCE TO RELATED APPLICATIONS

This application is based upon and claims the benefit of priority from the prior Japanese Patent Application No. 2004-208940, filed on Jul. 15, 2004, the entire contents of which are incorporated herein by reference.

BACKGROUND OF THE INVENTION

1. Field of the Invention

The present invention relates to an automatic service apparatus and automatic service system for executing screen control and automatic service operation according to the screen content from a Web server, and more particularly to an automatic service apparatus and automatic service system which operate by the screen content, where the screen information and the device control information related to the screen are embedded.

2. Description of the Related Art

Automatic service apparatus are used for various service business, such as automatic withdrawal machines and automatic deposit/withdrawal machines in the financial field, and automatic ticket machines and automatic issuing machines in other fields. Along with the recent advancements of networks, such as the Internet, such automatic service apparatus which deposit/withdrawal, issue tickets, and output various information by using Web technology are being provided.

FIG. 31 is a block diagram depicting a conventional automatic service system, which shows the ATM (Automatic Teller Machine) system used for financial business. As FIG. 31 shows, a WWW (World Wide Web) server 300 and an automatic cash transaction apparatus 400 are connected via a network.

The server 300 sends the Web page (screen content) 500 to the automatic transaction apparatus (that is ATM) 400, which is a client, according to the request of the ATM 400. On this Web page, a program for creating a screen to be displayed on the display device is created in a page description language (HTML, JavaScript), and control programs of other devices (card processing device, cash processing device, pass book processing device, statement slip processing device), which are driven and controlled in relation to the display content of this one page (one screen), are embedded as objects.

For example, as FIG. 31 shows, a Web page 500 is comprised of a screen creation program, an applet tag for specifying an object (applet), a screen content 502 for specifying the execution method thereof by script, and applets 510 where programs for executing the method of the object (applet) are set, based on the HTML (Hyper Text Markup Language) page description language.

This Web page 500 is downloaded to the browser 410 of the ATM 400 from the WWW server 300. In the ATM 400, on the other hand, ATM middleware operates and the I/O operation (transaction operation) is executed based on the control of the kernel (OS). The ATM 400 has a card reader/writer unit 440, a receipt/journal printer 441, a bill/coin processing unit 442, a pass book processing unit 443 and a user operation panel as the I/O mechanical units.

The browser 410 displays the screen on the user operation panel according to the screen creation program of the Web page, analyzes the applet tag and the method name of the screen content 502, executes the corresponding program of the applet 510, and issues a command to the I/O units 440-443.

In this ATM controlled by the Web browser, it is proposed that the device interface assignment section (Machine ID) 420 is specified for each device (e.g. cash processor) as an embedded object (applet) of the screen content 502, and the operation method of each device is specified by the Script (JavaScript) of the screen content 502 (e.g. Japanese Patent Application Laid-Open No. 2000-298752).

In this method, the device interface assignment section 420 is specified by the applet tag of the screen content 502, and the device interface assignment section 420 sequentially reads the Script, decodes, assigns an operation instruction to the corresponding interface section 430-433, and operates the corresponding I/O units 440-443.

In this proposal, when ATMs with the same functions are controlled by the Web, a plurality of units can be operated by one applet tag of the screen content, therefore the number of descriptions in HTML of the screen content can be decreased, and there can be fewer embedded objects.

In the case of a Web-controlled automatic service device, however, an operation guide screen, such as a transaction screen, is displayed using a browser. And an I/O unit is controlled via the applet integrated into this transaction screen (content). Therefore processing cannot be requested to the I/O unit unless there is a download wait of an applet for each screen. As a result, for the user to operate a plurality of operations, a wait time is generated for each operation, which makes the service time, such as for a transaction, long.

Also when multiple input button images are displayed on the operation guide screen, the download time for applets and the download time for the button images become long, which in some cases is not good. For example, it is preferable in terms of visual sensation and design to dispose multiple buttons and change the button image display for normal status, inversion status and gray out status according to the pressing by the user. But it takes time to display for HTML and Script, so performance, in terms of visual sensation, improves if buttons are displayed by applets. But if applets are used, time is taken for a download, and the screen switching time becomes longer than HTML.

Because of this, the time for the user to use an automatic service device becomes long, which drops the operating rate and makes the response wait time for the user long.

SUMMARY OF THE INVENTION

With the foregoing in view, it is an object of the present invention to provide an automatic service apparatus and an automatic service system for decreasing the wait time for operation of the user who receives the service, even if Web control is used.

It is another object of the present invention to provide an automatic service apparatus and an automatic service system for decreasing the wait time for downloading applets of the operation guide screen, even if Web control is used.

It is still another object of the present invention to provide an automatic service apparatus and an automatic service system for decreasing the screen switching time of the operation guide system, even if Web control is used.

It is still another object of the present invention to provide an automatic service apparatus and an automatic service system for enabling screen transition during I/O control and decreasing the transaction time by making control applets a resident frame.

To achieve these objects, the automatic service apparatus of the present invention is an automatic service apparatus for communicating with a Web server and performing guide display and service operation according to operation by a user, has: a display unit for displaying the guide operation; a plurality of I/O units for performing the service operation; and a control unit for controlling the guide operation display on the screen of the display unit by a browser according to the screen content from the Web server, and controlling the plurality of I/O units according to a script embedded in the screen content. And the control unit stores in advance applets downloaded from the Web server in a resident frame of a browser screen, that is divided into a service screen frame and a resident frame, and performs the guide operation display by the screen content from the Web server, as well as calls up a method of an applet for controlling the I/O unit and controls the I/O unit by a script embedded in the screen content.

The automatic service system of the present invention comprises a Web server and an automatic service apparatus which is connected to the Web server via a network for communicating with the Web server, and performing guide operation display and service operation according to the operation by the user. And the automatic service apparatus further has a display unit for displaying the guide operation, a plurality of I/O units for performing the service operation, and a control unit for controlling the guide operation display on the screen of the display unit by a browser according to the screen content from the Web server, and controlling the plurality of I/O units according to the script embedded in the screen content. The control unit stores in advance applets downloaded from the Web server in a resident frame of a browser screen, that is divided into a service screen frame and the resident frame, and performs the guide operation display by the screen content from the Web server, as well as calls up a method of an applet for controlling the I/O unit and controls the I/O unit by the script embedded in the screen content.

The automatic service method of the present invention has the steps of: storing applets downloaded from a Web server in a resident frame of a browser screen, that is divided into a service screen frame and a resident frame of an automatic service apparatus; performing guide operation display on a display device of the automatic service apparatus by the screen content from the Web server; and calling up a method of an applet for controlling an I/O unit of the automatic service apparatus and controlling the I/O unit by the Script embedded in the screen content.

In the present invention, it is preferable that the control unit sets the service screen frame to display and the resident frame to non-display depending on the frame control content from the Web server.

Also in the present invention, it is preferable that the control unit further has a browser which interprets the screen content and performs the guide operation display, as well as interprets the script of the object embedded in the screen content, and calls up a method in processing units of the transaction operation for synchronously controlling the plurality of I/O units, and synchronously controls the plurality of I/O units from the browser.

Also in the present invention, it is preferable that the browser of the control unit allows the screen of the service frame to transit according to the screen content from the Web server, and does not allow the resident frame to transit except for the startup time.

Also in the present invention, it is preferable that the I/O unit further has at least a cash processing unit and a card processing unit.

Also in the present invention, it is preferable that the control unit further receives a screen image generation applet for generating an image of the guide operation screen from the Web server and embeds it into the resident frame, and generates an image file for displaying it on the service frame by the screen image generation applet, when the device is started up.

Also in the present invention, it is preferable that the control unit acquires the screen image file and displays it on the display unit when a callup instruction for the screen image generation applet is included in the screen content.

Also in the present invention, it is preferable that the screen image generation applet creates the screen image from a pattern definition file.

Also in the present invention, it is preferable that the screen image generation applet creates the arranged screen image file from multiple button images defined in the pattern definition file.

In the present invention, the screen frame of the browser is divided into a transaction frame and a resident frame, and all the applets are downloaded from the server to the resident frame of the browser of the automatic service device in advance. And during communication with the Web server for screen transition, applets are not transmitted but the transaction screen, where a tag for specifying the applet is embedded, is transmitted. So the download time of the applet can be deleted when the transaction screen transits can be decreased. Therefore the wait time of the user for screen transition can be decreased, the time for the user to use the automatic service apparatus can be decreased, use can be more efficient, and the operating efficiency of the apparatus also improves.

When the apparatus is started up (e.g. at power ON), the screen image generation applet, in addition to the I/O control applet, is also downloaded from the server to the applet resident frame (invisible frame) of the browser in embedded foam. And in the resident frame, the screen image generation applet acquires the button images to be used in the transaction screen and the screen image in advance, and during communication with the server, the transaction screen content is received according to the transaction operation, and when the screen control applet is downloaded, the screen image is acquired from the screen image generation applet of the resident frame, and is drawn in the transaction frame.

Therefore the screen display time of the applets and the download time of the button images can be decreased at screen transition time, so the screen switching time can be decreased. Even if a complicated pattern is displayed for visual sensation, the image switching time can be decreased, and this contributes to improving the visual sensation of the user during the operation input.

BRIEF DESCRIPTION OF THE DRAWINGS

FIG. 6 is a table showing the transaction commands of the common interface in FIG. 3 and FIG. 5;

FIG. 7 is a table showing the agents in FIG. 3 and FIG. 4;

FIG. 8 is a table showing other agents in FIG. 3 and FIG. 4;

FIG. 11 is a flow chart depicting the download processing when the Web server starts up the device shown in FIG. 3;

FIG. 12 shows the frame division processing in FIG. 11;

FIG. 13 shows the applet download processing in FIG. 11;

FIG. 16 shows the definition example of the transaction frame in FIG. 15;

FIG. 17 is a diagram depicting the method callup operation of the browser in FIG. 14;

FIG. 18 is a diagram depicting a deposit processing according to an embodiment of the present invention;

FIG. 20 is a block diagram depicting a browser and a resident applet according to another embodiment of the present invention;

FIG. 21 is a table showing an agent of another embodiment of the present invention;

FIG. 24 shows the definition example of the applet callup processing of the resident frame in FIG. 22;

DESCRIPTION OF THE PREFERRED EMBODIMENTS

Embodiments of the present invention will now be described in the sequence of automatic service system, I/O control mechanism by Web control, I/O control method by Web, automatic service processing, screen switching control method and other embodiments.

Automatic Service System

Figure 1:
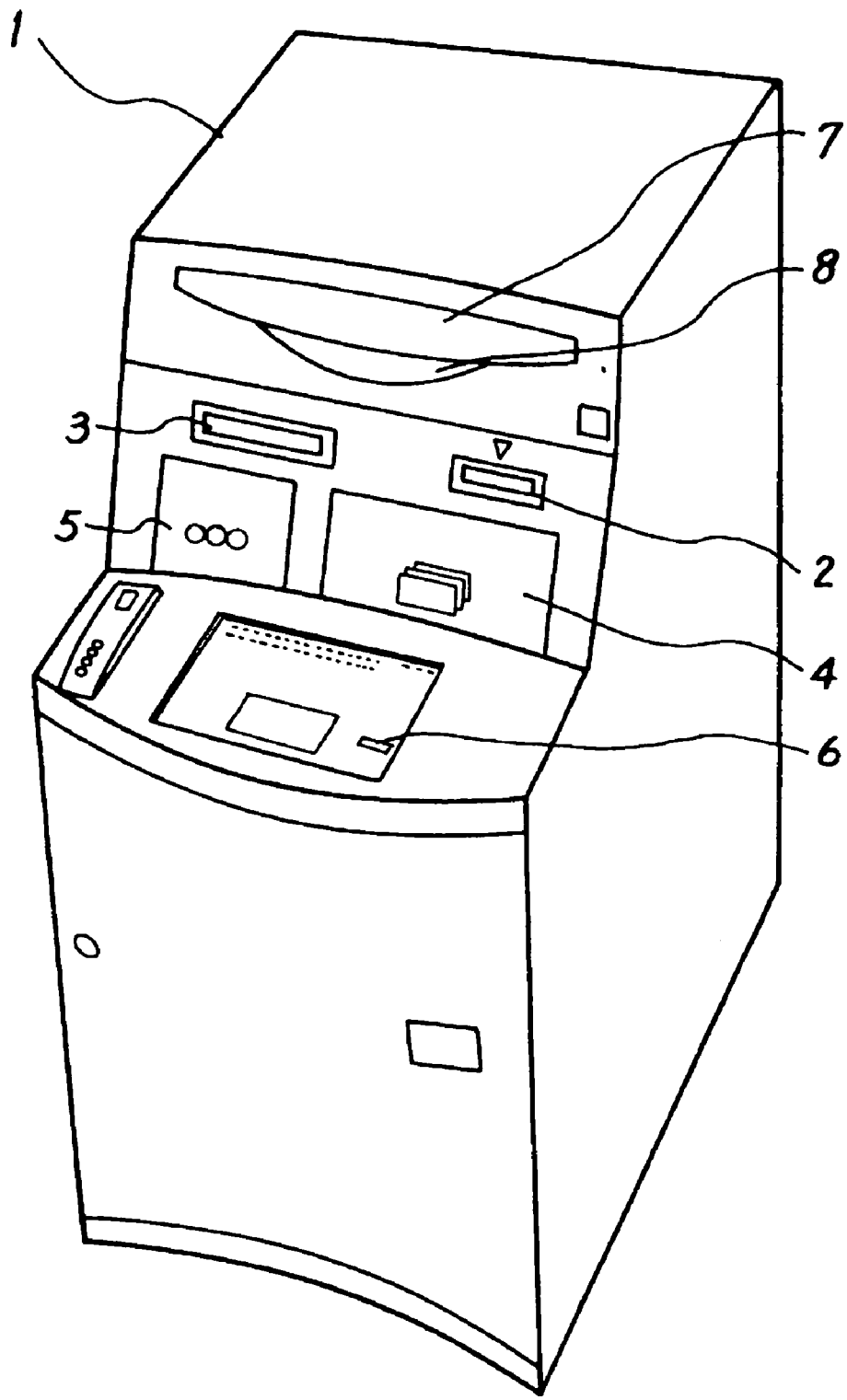
FIG. 1 is an external view depicting an automatic service apparatus according to an embodiment of the present invention.
Figure 2:
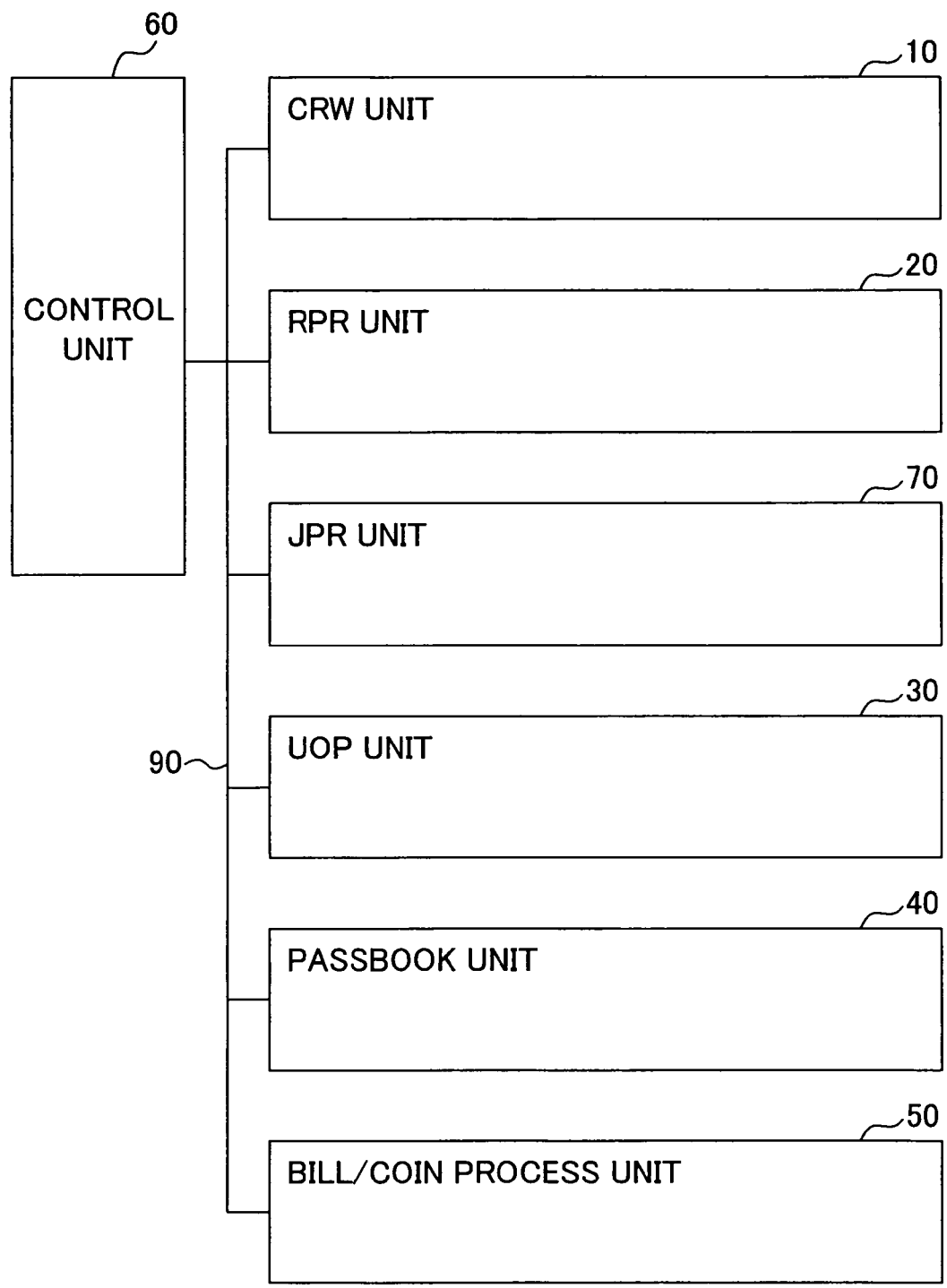
FIG. 2 is a block diagram depicting the automatic service apparatus in FIG. 1.
Figure 3:
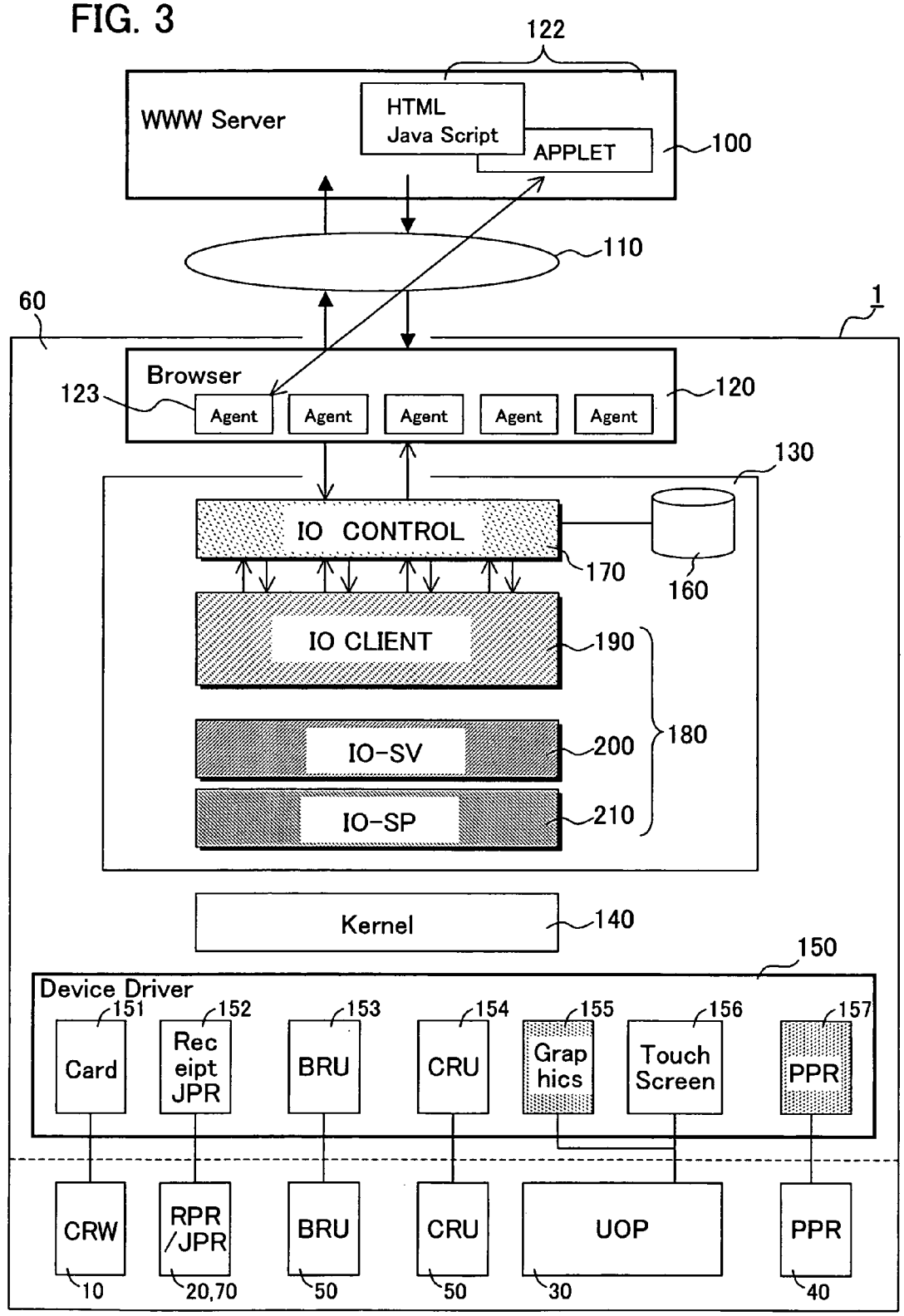
FIG. 3 is a system block diagram depicting an automatic service system according to an embodiment of the present invention.

FIG. 1 is an external view depicting an automatic service apparatus according to an embodiment of the present invention, FIG. 2 is a block diagram depicting the automatic service apparatus in FIG. 1, and FIG. 3 is a system block diagram depicting an automatic service system according to an embodiment of the present invention. FIG. 1 to FIG. 3 show an automatic transaction apparatus in a financial institution as the automatic service apparatus.

As FIG. 1 shows, the automatic transaction apparatus 1 has a card slot 2 for inserting and ejecting a magnetic card, pass book slot 3 for inserting and ejecting a magnetic pass book, a bill port 4 for inserting and ejecting bills, a coin port 5 for inserting and ejecting coins, a UOP (User Operation Panel) 6 for guiding operation for users, an operation display 7 for displaying operating status to a user, and a customer sensor 8 for detecting the user.

FIG. 2 is a block diagram of the automatic transaction apparatus 1 in FIG. 1. The CRW (Card Reader Writer) unit 10 transports the magnetic card inserted into the card slot (card insertion slot) 2 by a transport mechanism, which is not illustrated, and reads it during this transportation and returns it to the slot 2. In the CRW unit 10, an image sensor is installed for optically reading the magnetic card (embossed portion).

The RPR (Receipt Printer) unit 20 prints the transaction result on receipt paper by a print head, and ejects the receipt through the card slot 2. The RPR unit 20 also stores the receipt returned through the slot 2 when the ejected receipt is not removed by the user within a predetermined time.

JPR (Journal Printer) unit 70 prints the transaction status and result on journal paper by a print head. The UOP (User Operation Panel) unit 30 has the UOP 6 which is a display with a touch panel, and the control circuit thereof. The pass book (PPR) processing unit 40 reads the magnetic pass book inserted into the pass book slot 3, prints the transaction result on the magnetic pass book, and ejects it through the pass book slot 3.

The bill/coin processing unit 50 performs the deposit operation for verifying and counting the bills and coins inserted into the bill port 4 and the coin port 5, storing them in a stacker, and performs the withdrawal operation for taking out the requested bills and coins from the cash stacker, and releasing the currency to the bill port 4 and the coin port 5.

The control unit 60 is connected to these processing units 10, 20, 30, 40, 50 and 70 via a network 90, such as a LAN, and performs automatic transaction processing according to the configuration of the software, which will be described later in FIG. 3.

FIG. 3 is a block diagram depicting an automatic transaction system according to an embodiment of the present invention. The automatic transaction apparatus 1 exchanges commands, parameters and data required for a transaction processing with the WWW (World Wide Web) server (host) 100 via a network 110, such as the Internet. In the automatic transaction apparatus 1, the above mentioned control unit 60 is mounted a browser 120, ATM middleware 130, kernel (OS) 140 and device drivers 150.

Device drivers 150 has a card unit driver 151 for driving the card (CRW) unit 10, a receipt/journal unit driver 152 for driving the receipt/journal unit (RPR/JPR) 20 and 70, a BRU driver 153 for driving the BRU (bill) unit 50, a CRW driver 154 for driving the CRU (coin) unit 50, a graphic driver 155 and a touch screen driver 156 for driving the UOP 30, and PPR driver 157 for driving the pass book unit 40.

The browser 120 is constructed of such a Web browser as Internet Explorer® (Microsoft Corp.), requests the Web server 100 to send content, and interprets and displays the screen content (Web page) sent by the Web server 100. In this case, the browser 120 requests the Web page required for a transaction constructed by HTML and JavaScript, interprets the transmitted Web page, and controls the ATM middleware 130 and the screen of the UOP 30.

The kernel 140 is constructed of a known OS (Operating System), such as Windows® (Microsoft Corp.) and Linux, and under the operation of the kernel 140, the browser 120, ATM middleware 130 and device drivers 150 operate.

The ATM middleware 130 has a parameter file 160, I/O control layer 170, I/O client layer 190, I/O server layer 200 and I/O service provider layer 210.

This I/O client layer 190 is for controlling an individual I/O unit installed in the apparatus, the I/O server layer 200 is for starting and ending an I/O operation and controlling the communication protocol, and the I/O service provider layer 210 is for converting the messages addressed to each I/O unit. These are conventional middleware 180, which are designed according to the functional range, type of apparatus and specifications of the I/O units connected thereto.

The I/O control layer 170, on the other hand, transmits/receives commands and data with the Web server 100 by using a middleware common application programming interface protocol. Since the functional range is different depending on the apparatus model, this common application programming interface (API) is constructed of common commands and a data system which can operate all models, and will be described later in FIG. 6.

The I/O control layer 170 integrates the application programming interface (API) of the I/O client layer 190 and constructs a common API with a high degree of abstraction. The parameter file 160 is for storing the input parameters/fixed parameters which are uniquely determined depending on the system specifications which are specific to a vendor (ATM manufacturer).

The I/O control layer 170 calls up the parameters unique to each I/O client from the parameter file 160 when calling up the I/O client layer 190, and converts the common API into the conventional client API.

By this, the common API with a high degree of abstractions can be converted into a client API that matches the type of ATM middleware 190 and the I/O unit of the automatic transaction apparatus 1, and can operate the conventional ATM middleware 180 and the I/O unit. In other words, the conventional ATM middleware can be customized so as to operate with a common API.

As FIG. 3 shows, the agents 123 defined in processing units of the ATM are embedded as applets of the screen content 122 of the Web page. And operation of the I/O units required for processing is controlled in processing units by the agent 123. Also as described later, the necessary applets 123 are downloaded to the browser 120 of the control unit 60 of the ATM 1 from the server 100 when the apparatus is started up.

As described for FIG. 4 and later, the applet name is defined in processing units, such as synchronous control or initialization control of synchronous control (hereafter called an "agent"), and method is also defined in processing units. In other words, an applet (agent) having a method for controlling operation of the I/O unit corresponding to the processing is created, and the applet (agent) and method are specified in processing units.

Because of this, even when a plurality of units are synchronously operated, the operation can be performed in processing units. Furthermore, an applet name can be assigned in processing units, therefore the locations of changes on a Web page can be few for the Web control for ATMs having different functions, and a Web page can be easily created even for complicated automatic transaction control.

Also a plurality of I/O units can be controlled simply by calling up one method, so a plurality of I/O units can be parallel-controlled, the processing speed can be increased, the ATM control time can be decreased even if Web control is used, and the wait time for the user can be decreased.

I/O Control Mechanism by Web Control

The I/O control mechanism by Web control will now be described. FIG. 4 is a block diagram of the Web browser 120 and the I/O controller 130 in the configuration in FIG. 3, FIG. 5 is a block diagram depicting the ATM middleware in the configuration in FIG. 3, and FIG. 6 is a table showing the commands of the common API in FIG. 3 and FIG. 4.

Figure 4:
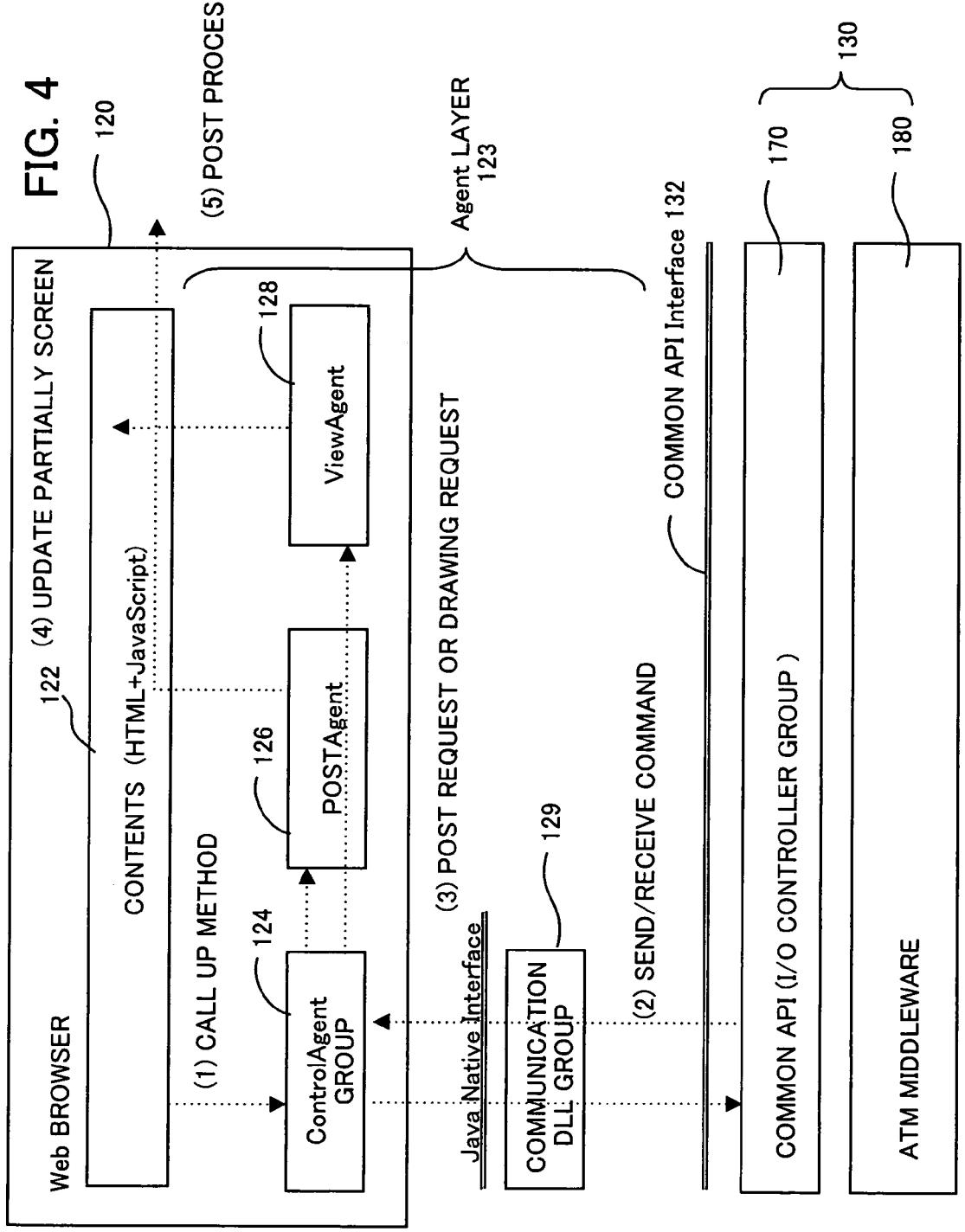
FIG. 4 is a diagram depicting the browser and screen content in FIG. 3.
Figure 5:
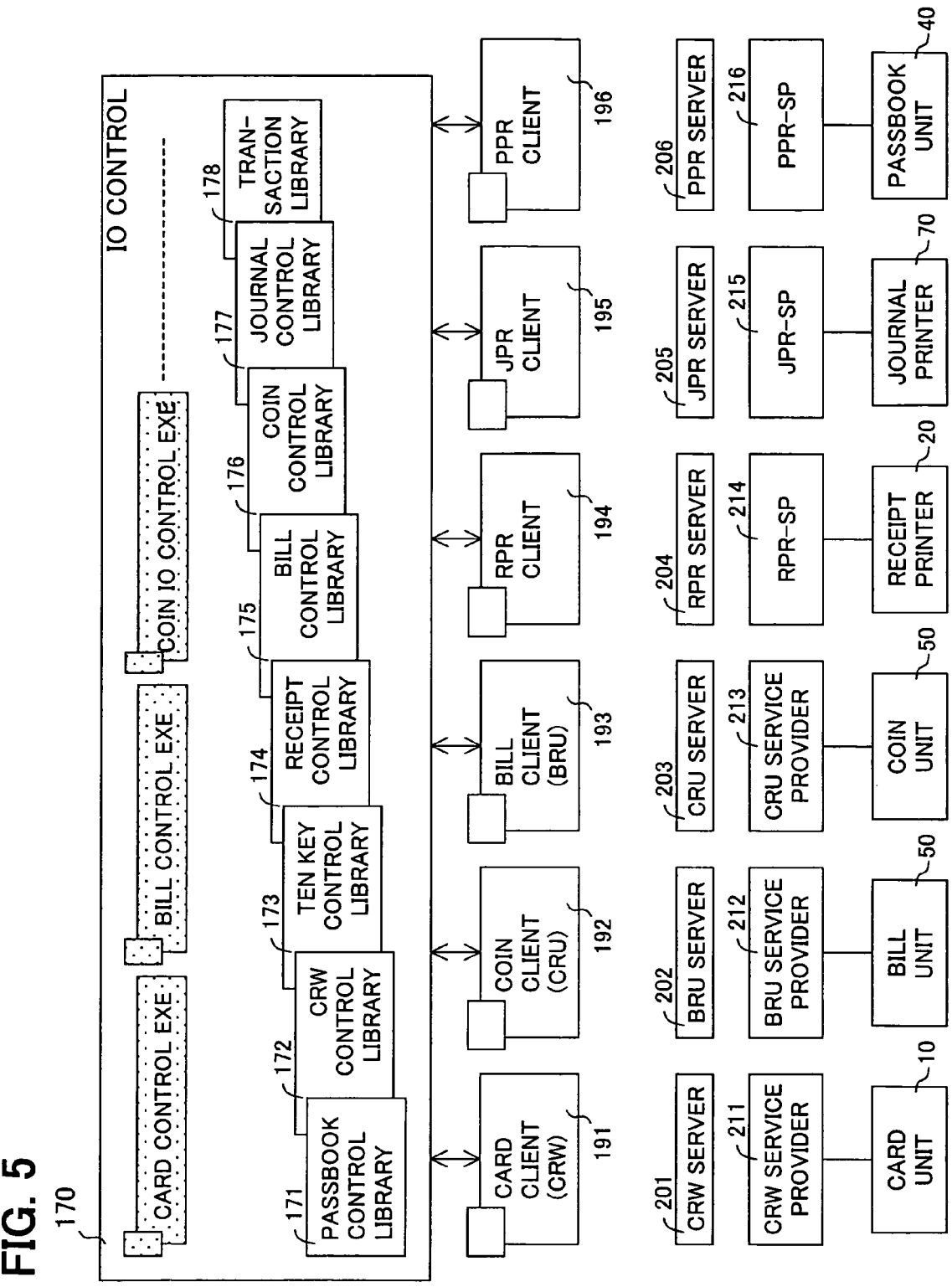
FIG. 5 is a block diagram depicting the ATM middleware in FIG. 3 and FIG. 4.

As FIG. 4 shows, the screen content (HTML+JavaScript) 122 and the Agents (applets) 123 are downloaded from the WWW server 100 to the Web browser 120. The Agent 123 has a control agent group 124 for controlling each unit, a POST Agent 126 for performing post-processing, a View Agent 128 for constructing a screen, and the communication DLL (Dynamic Link Library) group 129 for communicating with the I/O controllers 170 via the Java Native Interface and common API interface 132.

When all interfaces are the same, the communication DLL group 129 is unnecessary. For the control agent group 124, only the control Agent required for transaction control is downloaded in advance when the apparatus is started up, after which it resides in the browser 120. As described for FIG. 7 or later, the control Agent is constructed in processing units in the ATM transaction.

In the operation of the configuration in FIG. 4, the method of the control Agent 124 is called up by the method name described in the JavaScript in the screen content 122. The called up method issues a command to the I/O controller 170 via the communication DLL group 129.

The I/O controller 170 operates the corresponding unit via the ATM middleware 180, and receives an operation completion notice. The I/O controller 170 responds to the execution result of the command to the control Agent 124. The control Agent 124 sends a POST request or drawing request to the POST Agent 126 for performing post-processing or the View Agent 128 for updating the screen, so as to have post-processing or screen update processing to be executed.

Before describing the Agent, the common API will be described first. FIG. 6 shows an example of command types of the common API. A card insertion command and card eject command are provided as CRW (Card Reader/Writer) commands.

A print command and an eject command are provided as RPR (Receipt Printer) commands. And a pass book insertion command, print command, MS (Magnetic Stripe) write command, pass book eject command and auto turn page command are provided as PPR (Pass book Printer) commands.

An initialization command, receive/count command, store command, deposited money return command, feed command, eject command, capture command, transport path check command and jam reset command are provided as BRU (Bill Recycle Unit) commands. CRU (Coin Recycle Unit) commands are the same, and the description thereof is omitted.

The configuration of the ATM middleware 130 in FIG. 3 and FIG. 4 will now be described with reference to FIG. 5. The I/O control layer 170 has the I/O control library group (I/O controllers) 171-178 for controlling each I/O.

In this case, the I/O control library group has a pass book control library 171, CRW control library 172, numeric keypad control library 173, receipt control library 174, bill control library 175, coin control library 176, journal control library 177 and transaction control library 178.

These control libraries 171-178 are called up by a task (e.g. card control EXE) specified by the common API, and the task is converted into the client API of the conventional middleware using the above mentioned parameter table 160.

The I/O client layer 190 of the conventional middleware 180 is for controlling an individual I/O unit mounted on the apparatus, and here the card (CRW) client 191, coin client 192, bill client 193, RPR client 194, JPR client 195 and PPR client 196 are disposed.

The I/O server layer 200 is also divided into individual I/Os for starting up and ending an individual I/O operation and controlling communication protocol. In other words, the card (CRW) server 201, coin server 203, bill server 202, RPR (Receipt Printer) server 204, JPR server 205 and PPR (pass book printer) server 206 are disposed.

In the same way, the I/O service provider layer 210 is also divided into individual I/Os for converting a message addressed to an individual I/O unit. In other words, the card (CRW) service provider 211, coin service provider 213, bill service provider 212, RPR service provider 214, JPR service provider 215 and PPR service provider 216 are disposed.

In other words, the control library, client, server and service provider constituting the ATM middleware are disposed corresponding to an individual unit, and the I/O control 170 converts requested commands and parameters of the common API into commands and parameters of the conventional middleware API, and operates the I/O unit via the conventional middleware.

Now the above mentioned Agent will be described with reference to FIG. 7 and FIG. 8. AS FIG. 7 shows, the synchronous Agent is a program for synchronously controlling a plurality of I/O units, and has initialization, mechanical reset, bill/coin insertion, media simultaneous eject, print/feed/MS write/eject preparation, deposit return, storage, forced eject/capture, unit information acquisition/transaction status setting/two screen display control, deposit/withdrawal preparation, forced replenishment, jam rest and card/pass book insertion as methods (programs).

Each method issues a command to the I/O controllers (that is the I/O units) indicated by a black dot in FIG. 7, and receives a response on the result of command execution. For example, the initialization method issues an initialization command to the bill controller 175, coin controller 176, pass book controller 171, card controller 172, receipt controller 174, journal controller 177, transaction control controller 178 and numeric keypad controller 173 (see FIG. 5), has each controller execute initialization processing, and receives the initialization processing result from each controller as a response.

In the same way, the mechanical reset method issues a mechanical reset command to the bill controller 175, coin controller 176, pass book controller 171, card controller 172, receipt controller 174 and journal controller 177 (see FIG. 5), has each controller execute mechanical reset processing, and receives the mechanical reset processing result from each controller as a response.

In the same way, the bill/coin insertion method issues an insertion command to the bill controller 175 and the coin controller 176 (see FIG. 5), has each controller execute the insertion processing, and receives an insertion processing result from each controller as a response.

In the same way, the POST Agent has a post-processing method and a post-data holding method. The View (text display) Agent has a font setting method, text display method and text delete method.

Also as FIG. 8 shows, the applets for controlling a single I/O unit are also defined as agents for controlling with the same architecture. In other words, as FIG. 8 shows, the bill control Agent, pass book control Agent, card control Agent, receipt control Agent, transaction control Agent and numeric keypad Agent are disposed.

And the bill control Agent has a receiving/counting method, storage method, deposit return method, eject method and cancellation method for controlling bill controller 175 respectively. The pass book control Agent has a line set/page mark read method, MS (Magnetic Stripe) read method, auto turn page method, page check auto turn method, and pass book configuration information setting method for controlling pass book controller 171 respectively.

The card control Agent has a card insertion method, cancellation method, bank transfer card printing method, bank transfer card issuing method and eject preparation method for controlling card (CRW) controller 172 respectively. The receipt control Agent has an overlay registration method and eject preparation method for controlling each receipt controller 174.

In the same way, the transaction control Agent has a transaction information setting method, device status monitoring method, device status acquisition method, operation information setting method and cancellation method for controlling transaction control controller 178 respectively. The numeric keypad Agent has a numeric keypad input start method and numeric keypad input end method for controlling numeric keypad controller 173 respectively.

I/O Control Method by Web

Figure 9:
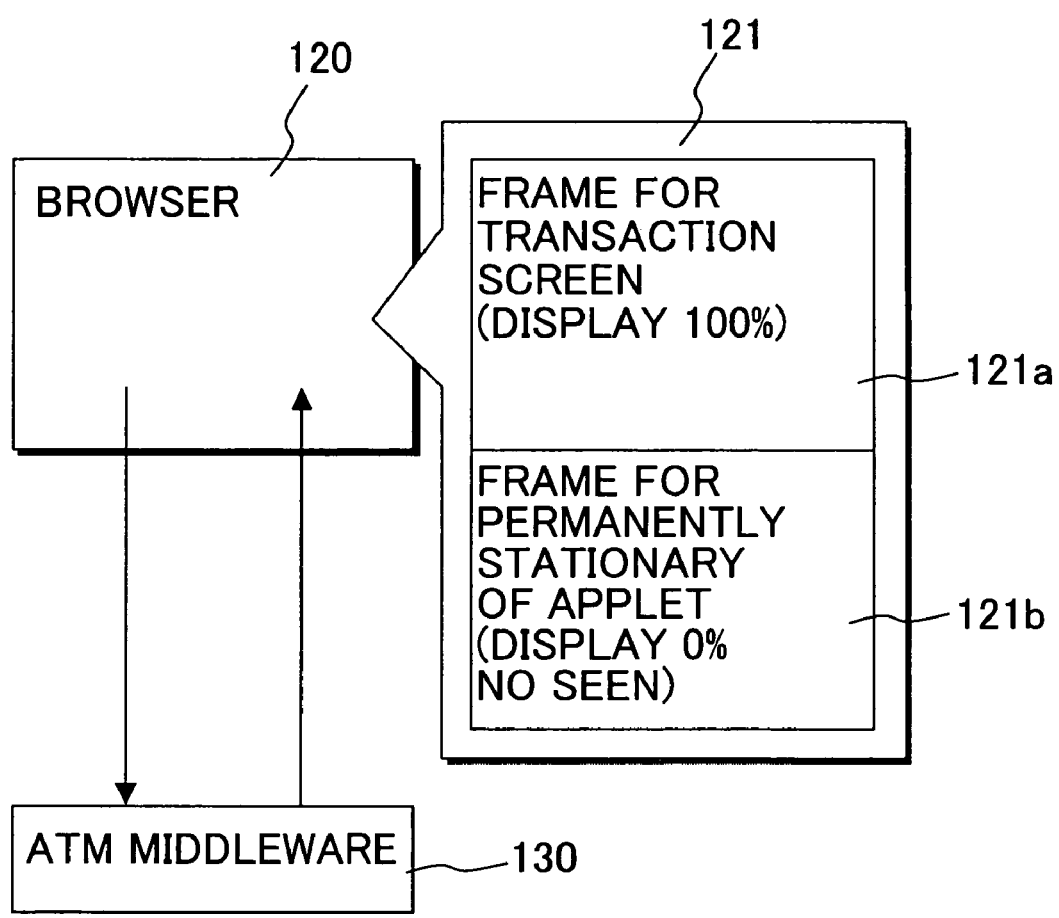
FIG. 9 is a diagram depicting the frames of the browser in FIG. 3 and FIG. 4.

The Web operation for calling such Agents and methods will be described with reference to FIG. 9 to FIG. 17. First according to the present invention, Agents (applets) are downloaded in advance and reside in the browser when the apparatus is started up, and at the subsequent transaction operation, the applets are not transmitted by the Web content, but the applet related to the screen is specified. FIG. 9 is a diagram depicting the screen frame of the Web browser, and FIG. 10 is a diagram depicting the operation in FIG. 9.

As FIG. 9 shows, the screen (memory) 121 of the browser 120 is divided into a plurality of frames 121*a* and 121*b*. In other words, the screen is divided into the transaction screen frame 121*a* and the applet resident frame 121*b*, where the transaction screen frame 121*a* is set to display 100%, and the applet resident frame 121*b* is set to display 0%. Therefore in the UOP 6, the applet resident frame 121*b* is not displayed, and only the transaction screen frame 121*a* is displayed.

Figure 10:
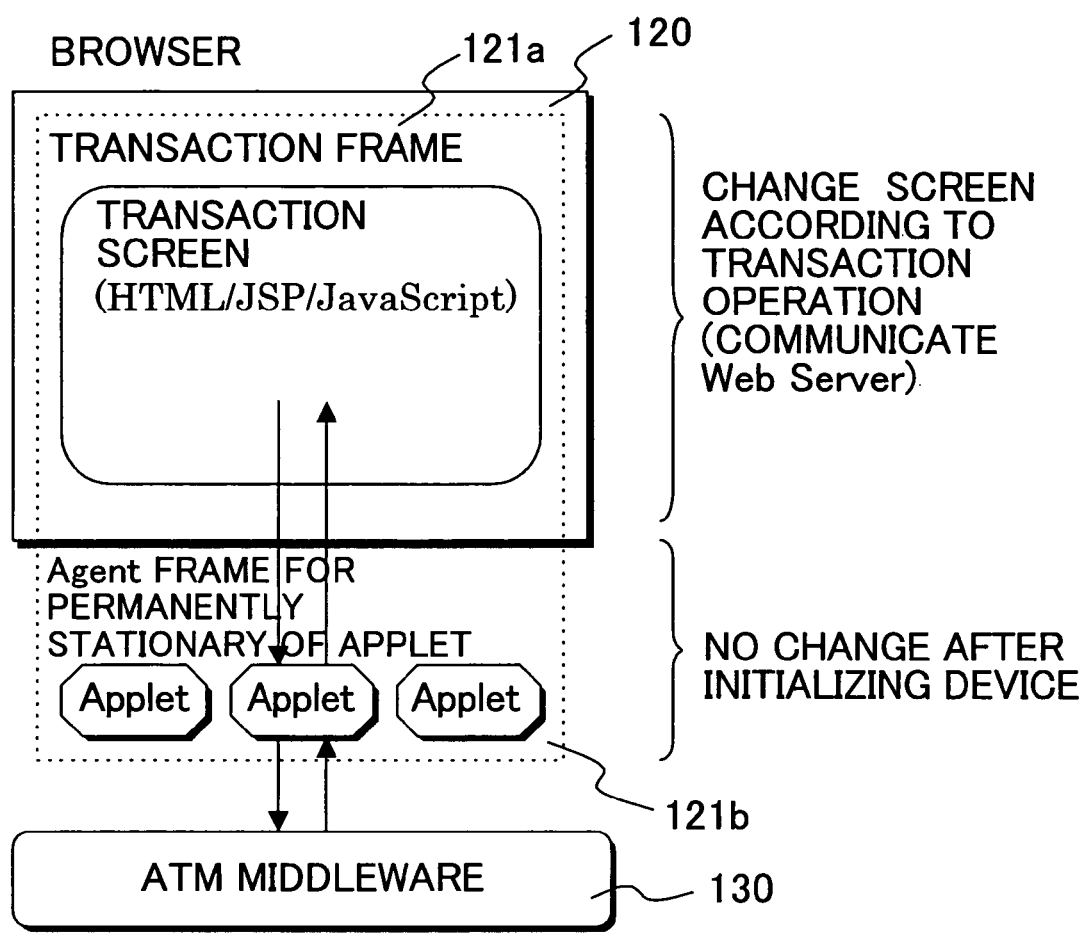
FIG. 10 is a diagram depicting the operations of the browser in FIG. 3 and FIG. 4.

And as FIG. 10 shows, when the apparatus is started up (e.g. at power ON), all the applets are downloaded and embedded in the applet resident frame (invisible frame) 121*b* of the browser 120 of the ATM 1 from the server 100 in advance.

Then according to the transaction operation, the transaction screen content described by HTML/JSP (Java Server Page)/JavaScript is received from the server 100 to communicate with the server 100, the transaction screen is displayed on the UOP 6 by the transaction frame 121*a*. While, the applets in the applet (also called Agent) resident frame 121*b* are called up by the method request instruction in the transaction screen content, the I/O is controlled via the ATM middleware 130, and the control result is responded sent to the transaction screen side via the applet.

In other words, the screen of the transaction screen frame 121*a* transits according to the transaction operation as shown in FIG. 10, but the screen of the applet resident frame 121*b* does not transit except for the apparatus startup time.

FIG. 11 is a flow chart depicting the server when the apparatus is started up, FIG. 12 shows the transmission data for frame division in FIG. 11, and FIG. 13 shows the applet for download in FIG. 11.

Now the download processing in FIG. 11 will be described with reference to FIG. 12 and FIG. 13.

(S10) When the ATM 1 notifies the server 100 of the startup of the apparatus via the network 110 by the power ON of ATM 1, the server 100 transmits HTML/JSP for frame division to the browser 120 of the ATM 1 via the network 110, as shown in FIG. 12. As FIG. 12 shows, JSP is for instructing a frame set (FRAMESET), and a frame is constructed of a menu frame and sub-main frame, where the display rates COLS thereof is set to "0%" and "100%" respectively. So as FIG. 9 shows, in the browser 120, the menu (resident in this case) frame 121*b* is set to display 0% and the sub-main (transaction in this case) frame 121*a* is set to display 100%.

(S12) When this setup ends, the server 100 downloads all the applets shown in FIG. 13 to the resident frame (memory) 121*b* of the browser 120 of the ATM 1. As FIG. 13 shows, each applet (method) shown in FIG. 7 and FIG. 8 are downloaded along with the applet tags. For example, the first applet in FIG. 13 is an initialization method of the synchronous control Agent in FIG. 7. The browser 120 of the ATM 1 stores this downloaded applet in the resident frame (memory) 121*b* and allows it to reside there.

Figure 14:
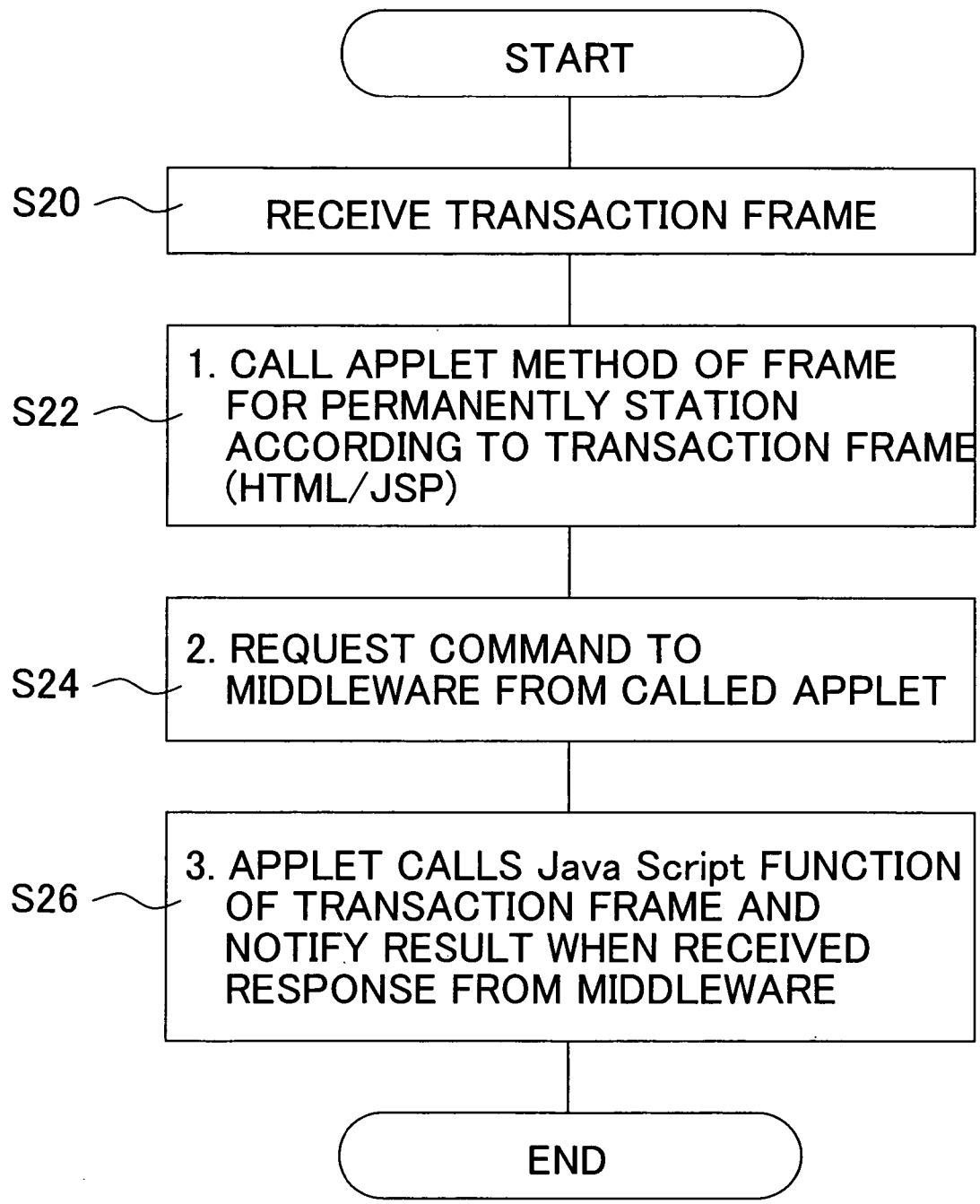
FIG. 14 is a flow chart depicting the I/O control processing by an agent of the browser of the automatic service apparatus in FIG. 3.
Figure 15:
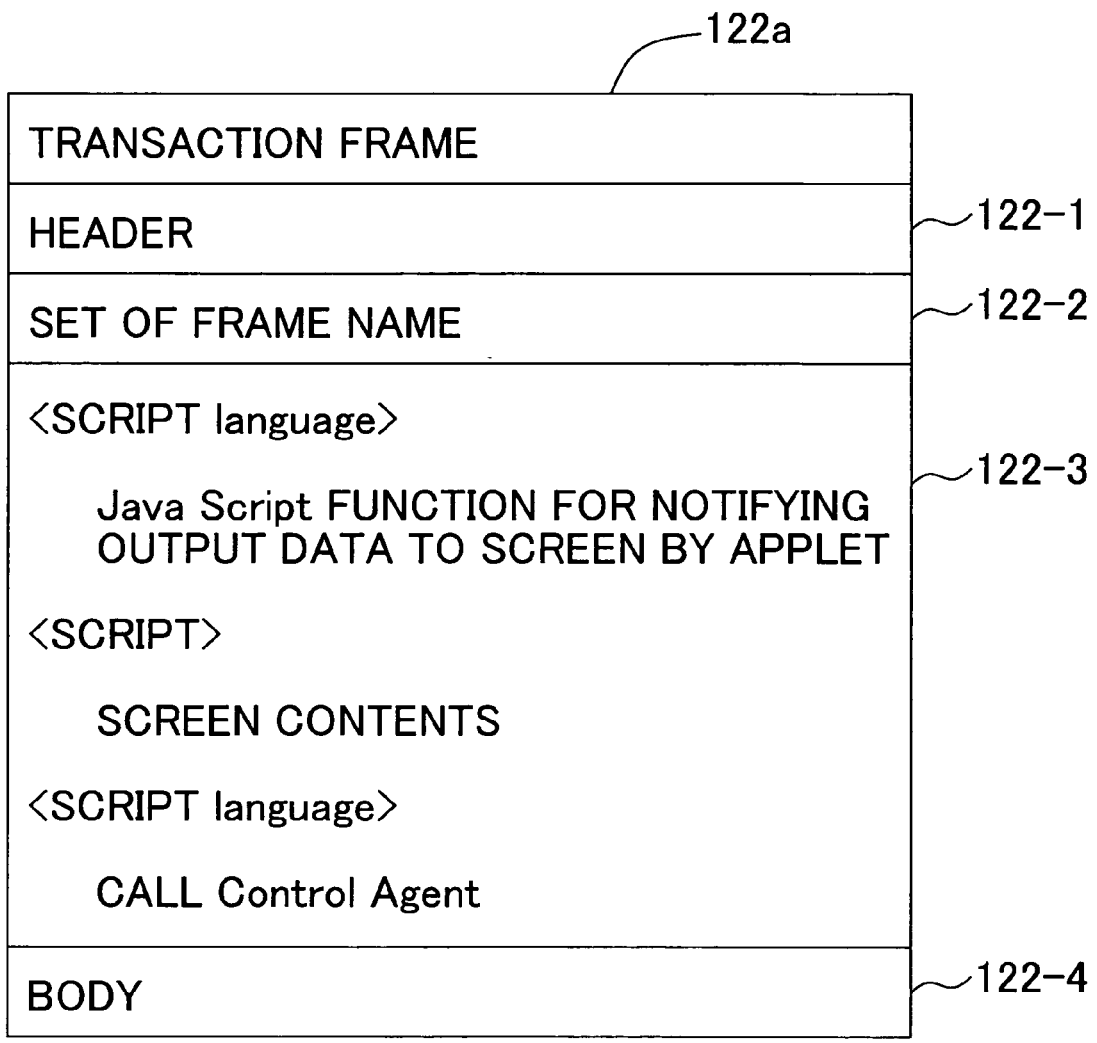
FIG. 15 shows the transaction frame in FIG. 14.

Now processing in the transaction operation will be described. FIG. 14 is a flow chart depicting the I/O control processing of the browser during the transaction operation of the present invention, FIG. 15 shows the configuration of the transaction screen of the transaction frame, FIG. 16 shows the transaction frame, and FIG. 17 is a diagram depicting the I/O control by the transaction screen in FIG. 16.

The browser processing in FIG. 14 will be described with reference to FIG. 15 to FIG. 17.

(S20) The browser 120 of the ATM 1 receives the image content (HTML/JSP) of the transaction frame from the server 100. As FIG. 15 and FIG. 16 show, the transaction screen content (JSP) 122 described in HTML (page description language) is constructed of the header 122-1, setup description of the frame name of the transaction screen 122-2, script column (screen content) 122-3 and body 122-4, and does not include applets. The script column 122-3 has a JavaScript function for the applet to notify the output information to the screen side, a script of the screen content, and a specifications column to specify the Agent name to be called up on the screen.

FIG. 16 shows an example of calling up the initialization method of the synchronous control (Sync) Agent by the script embedded in the screen. In other words, by the description of <SCRIPT Language="javaScript">, callup of the initialization method of the synchronous control agent is specified by JavaScript. In other words, by the setup description 122-2 of the frame name, the frame name of the transaction screen is first notified from the transaction screen to the Agent before transaction is started. This means that the frame name is set in advance so that the Agent side can notify the output information to the transaction screen side. In this case, "frame2.document" specifies the resident frame, and "U_agtPost" specifies the PostAgent, and (strFrameName) specifies the frame name of the transaction screen.

Then the function to be called up by PostAgent is defined by the javascript 122-3*a*. And the screen content itself is defined by JavaScript 122-3*b*. Here an example of displaying screen "Please Wait" on the screen is shown. Finally the method of the Agent to be requested from the transaction screen side is specified by javascript 122-3*c*. In other words, calling up the initialization method of the synchronous control Agent is specified by the description "ret=parent.frame2.document, U_agtSync_initial.initial".

(S22) When the screen content of the transaction frame is downloaded to the browser 120, the method of the applet of the resident frame is called up from the transaction frame (HTML/JSP). As FIG. 17 shows, the initialization method of the synchronous control Agent is called up by the script 122-3C. Along with this, screen content is displayed on the screen, as described above by the script 122-3*b*.

(S24) The called up (initialization) method requests the ATM middleware 130 by a command. For example, the initialization method issues the initialization command to the bill controller 175, coin controller 176, pass book controller 171, card controller 172, receipt controller 174, journal controller 177, transaction control controller 178 and numeric keypad controller 173 (see FIG. 5), has each controller execute initialization processing, and receives the initialization processing result from each controller as a response.

(S26) The initialization method which was called up continuously issues the initialization command to the bill controller 175, coin controller 176, pass book controller 171, card controller 172, receipt controller 174, journal controller 177, transaction control controller 178 and numeric keypad controller 173 (see FIG. 5), and receives a response from these controllers sequentially as each completes processing. Therefore I/O units can be controlled in parallel, and even a plurality of I/O units can be controlled in a short time. The applet calls up the JavaScript function of the transaction frame (transaction screen side) by the Script description 122-3*a*, and notifies the output result by an argument. By this, the transaction screen processing ends.

In this way, the screen frame 121 of the browser 120 is divided into the transaction frame 121*a* and the resident frame 121*b*, and all the applets 123 are downloaded from the server 100 to the resident frame 121*b* of the browser 120 of the control unit 60 of the ATM 1 when the apparatus is started up.

And during communication with the Web server 100 for screen transition, applets are not transmitted but the transaction screen where the tags for specifying an applet are embedded is transmitted, so the applet download time when the transaction screen transits can be decreased. Therefore the wait time for the user when the screen transits can be decreased, the operating time of the user can be decreased, operation becomes efficient, and the operating efficiency of the apparatus can also be improved.

And the above mentioned Agents are disposed in processing units to which a processing unit name is assigned, so an ATM with various functions can be supported with the same applet tag and method names, merely by slightly changing the content in processing units. In this example, this is implemented by changing the input Param in the parenthesis of the method name of the above mentioned method callup SCRIPT. In other words, the input Param is constructed of 8-bit information for setting an input flag in each I/O controller (bill, coin, pass book, card, receipt, journal, transaction control and numeric keypad), and the input flag indicates allowing input of the method to the I/O controller where "1" is set.

The method called up refers to this input flag, and decides the I/O controller to which the command is issued. Therefore even an ATM with different functions can execute the same processing using the same applet tag and method names by operating the input flag using the Web server 100.

For example, in the case of the transaction apparatus which does not handle coins, the input flag of the coins is set to "0" in advance, then issuing a command to the coin controller can be prevented. In the same way, in the case of a transaction apparatus which does not handle a pass book, the input flag of the pass book is set to "0" in advance, then issuing a command to the pass book controller can be prevented.

Also by ParseInt (postMode) in the parenthesis of the method name of SCRIPT, the POST agent is specified within this agent. Therefore POST processing can be smoothly executed based on the control of the Agent.

Automatic Service Processing

Now the relationship of the screen content of the Web server 100, user operation screen (UOP), Agents and methods, and I/O controllers will be described using the card deposit transaction in FIG. 18 as an example.

When the apparatus is started up, the Web server 100 downloads applets by JSP (Java Server Page) and allows them to reside in the browser 120. Then the Web server 100 issues the screen content (where a specified applet name is embedded) of the transaction type selection to the ATM 1. In the ATM 1, the transaction type select screen is displayed on the user operation screen of the UOP 6 by the browser 120.

And in the ATM 1, the deposit/withdrawal preparation method of the synchronous control Agent in FIG. 7 is called up by the applet name and method name embedded in the screen content, and called up method issues the deposit/withdrawal preparation command to the bill controller 175 and coin controller 176 to have them prepare for deposit/withdrawal. Both controllers 175 and 176 respond with completion to the deposit/withdrawal preparation method when preparation for deposit/withdrawal completes.

When the deposit key is pressed on the type select screen of the UOP 6, this is reported to the Web server 100. By this, the Web server 100 transits to the card start processing by JSP, and issues the screen content of the insertion processing to the ATM 1. In ATM 1, the card insertion screen is displayed on the user operation screen of the UOP 6 by the browser 120.

And in the ATM, the card insertion method of the card control Agent is called up by the applet name 'card control' and the method name 'card insertion' embedded in the screen content, and the called up method issues the card insertion command by the card controller 172. The controller 172 operates the card unit 10 by the card insertion command. When the card unit 10 detects insertion of the card and reads the card, card insertion completion is responded to the card insertion method by the card control library 172.

And the card insertion method requests POST of the transaction status (card insertion detection and card read data in this case), and the POST agent 126 transmits a request to the Web server 100. In this case, the same control is possible by calling up the card/pass book insertion method of the synchronous control Agent and setting this input flag in the card controller in advance.

Then the JSP of the Web server 100 issues the screen content of the cash insertion processing to the ATM 1 by a request at the end of card insertion processing. In the ATM 1, the browser 120 displays the cash insertion screen on the user operation screen of the UOP 6 according to the screen content. And by the card control Agent, which is an applet name embedded in the screen content, and the card insertion, which is a method name, the bill/coin insertion method of the synchronous control Agent is called up, and the receive/count command is issued to the bill controller 175 and coin controller 176.

The bill controller 175 and coin controller 176 operate the bill unit and coin unit 50 by the receive/count command. The bill and coin units 50 open the insertion port, detect inserted bills and coins, close the insertion port, and count the inserted bills and coins. When counting is over, the bill controller 175 and coin controller 176 respond with the completion of receiving/counting to the bill/coin insertion method. And the bill/coin insertion method request POST of the transaction status (received number of bills/coins, total amount), and the POST agent 126 sends a request to the Web server 100.

The JSP of the Web server 100 transits to the deposit processing, such as a balance update, by a request at the end of cash insertion processing, issues the screen content of the computer screen to the ATM 1, and the ATM 1 displays the "Please Wait" screen on the user operation screen of the UOP 6.

And the browser 120 calls up the print/feed/MS write/eject preparation method (see FIG. 7) of the synchronous Agent (see FIG. 7), by the synchronous control Agent, which is an applet name embedded in the screen content, and the print/feed/MS write/eject preparations which are method names, and issues the MS write command and eject preparation command to the card controller 172, the print command and eject preparation command to the receipt controller 174, and print command to the journal controller 177.

By this, the card unit 10 writes the data on the magnetic stripe of the card and prepares for an eject of the card, the receipt printer 20 prints the receipt and prepares for an eject, and the journal printer 70 prints the data on the journal. Each controller 172, 174 and 177 responds with completion to the print/feed/MS write/eject preparation method by the completion of command execution.

And the print/feed/MS write/eject preparation method requests POST of the transaction status (eject preparation completion in this case), and the POST agent 126 sends a request to the Web server 100.

The JSP of the Web server 100 transits to medium eject processing and issues the screen content of the medium eject to the ATM 1. In the ATM 1, the browser 120 displays the medium eject screen on the user operation screen of the UOP 6. And the browser 120 calls up the medium eject method (see FIG. 7) of the synchronous control Agent by the synchronous control Agent, which is an applet name embedded in the screen content, and medium eject which is a method name, and issues the eject command to the card controller 172, the eject command to the receipt controller 174 and the bell regeneration command to the sound controller, which is not illustrated.

By this, the card unit 10 ejects the card, and the receipt printer 20 ejects the receipt, and detects the removal of the card and receipt. And if at least one of them is not removed within a predetermined time, a continuous sound is output. Each controller 172 and 174 responds with completion to the medium eject method by a completion of command execution.

And the medium eject method requests POST of the transaction status (removal completion in this case), and the POST Agent method 126 sends a request to the Web server 100.

Then the JSP of the Web server 100 receives the request at the completion of removal from the ATM 1, transits to the transaction end processing, and issues the screen content of the transaction end to the ATM 1. In the ATM 1, the end screen is displayed on the user operation screen of the UOP 6 by the browser 120. The browser 120 calls up the bill/coin method (see FIG. 7) of the synchronous control Agent by the synchronous control Agent, which is an applet name embedded in the screen content, and the bill/coin storage, which is a method name, and issues the storage command to the bill controller 175 and the coin controller 176.

By this, the bill unit and coin unit 50 store the counted bills and coins in the internal stacker. Each controller 175 and 176 responds with completion to the bill/coin method at the completion of command execution. And the bill/coin method requests POST of the transaction status (storage completion in this case), and the POST agent 126 sends a request to the Web server 100. By this, the Web server 100 returns to the above mentioned transaction type select processing, and repeats the same processing.

In this way, the applets (Agents) are downloaded from the Web server 100 in advance, so at screen transition the screen can transit without downloading the applets. Also the Agents for each processing of transaction processing are embedded in the screen content, so operation of a plurality of I/O units can be controlled by calling up one method in processing units, and a general transaction processing flow can be commonly used for different automatic transaction apparatus.

Therefore screen content for controlling automatic transaction apparatus with different functions and configurations by the Web can be easily created. And parallel control becomes possible, and high-speed I/O unit control can be implemented. By this, the wait time of the automatic transaction device for the user can be decreased, and the operating rate can be improved. This example was described using the card deposit processing, but the present invention can be applied in the same way to withdrawal processing, deposit processing and withdrawal processing using a pass book, entry processing and balance inquiries.

Screen Switching Method

Figure 19:
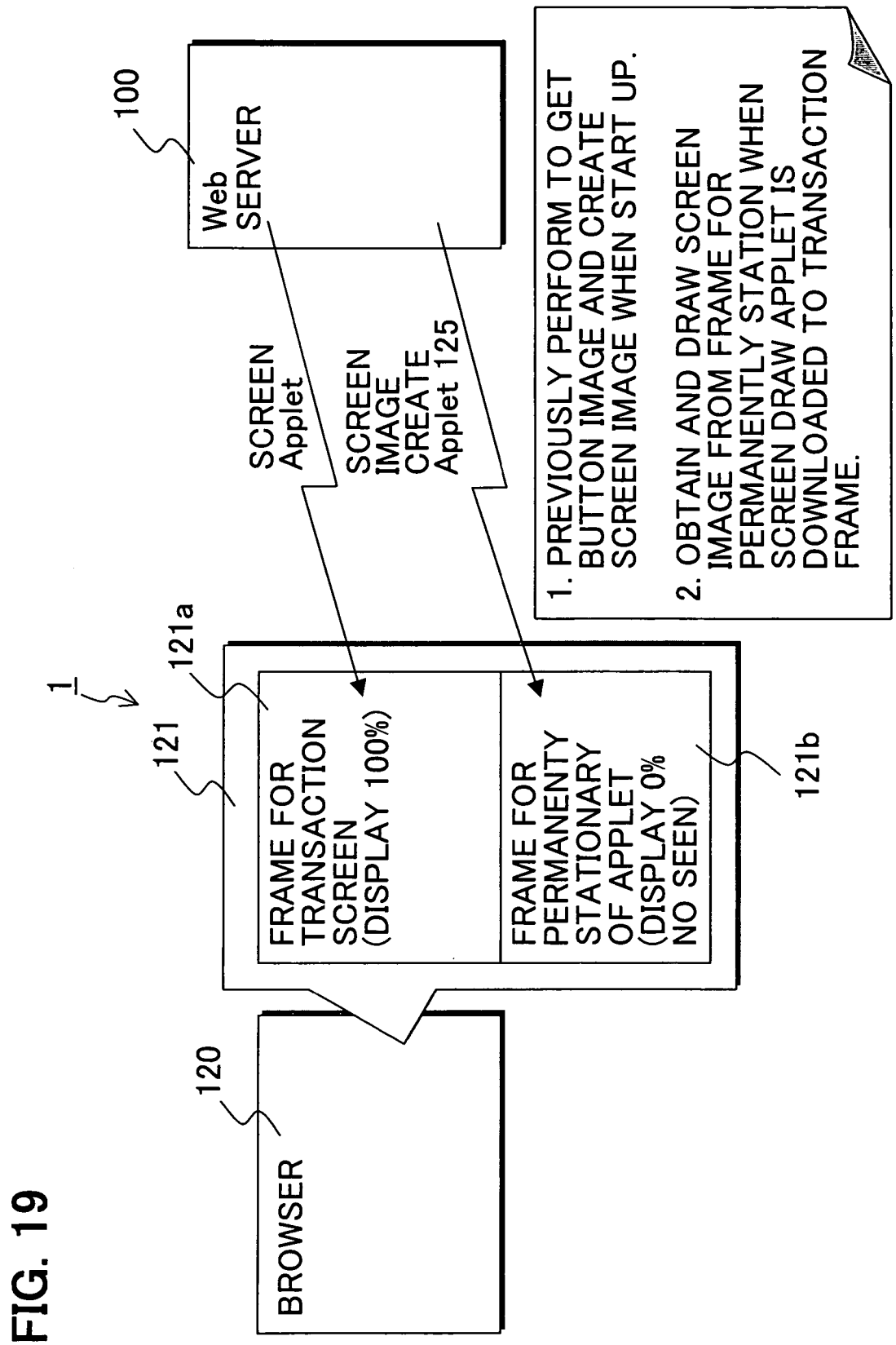
FIG. 19 is a diagram depicting an applet download processing according to another embodiment of the present invention.

A method of increasing the speed of screen drawing will be described next. FIG. 19 is a diagram depicting a system configuration according to the second embodiment of the present invention, FIG. 20 is a block diagram depicting the Web browser 120 and I/O controller 130 in the configuration in FIG. 19, and FIG. 21 shows the configuration of the Agent in FIG. 20.

As FIG. 19 shows, according to this embodiment, not only the control Agent (applet) but also the screen image generation applet are downloaded in advance when the apparatus is started up, and are allowed to reside in the browser. And in the subsequent transaction operation, the applet related to the screen is specified without transmitting the applet as Web content.

In other words, as FIG. 19 shows, the screen (memory) 121 of the browser 120 is divided into a plurality of frames 121a and 121b. This means that the screen is divided into the transaction screen frame 121a and the applet screen frame 121b, where the transaction screen frame 121a is set to display 100%, and the applet resident frame 121b is set to display 0%. Therefore the applet resident frame 121b is not displayed on the UOP 6, and only the transaction screen frame 121a is displayed.

And as FIG. 19 shows, when the apparatus is started up (e.g. at power ON), all the applets (the screen image generation applet 125 is added in this case) are downloaded from the server 100 and embedded in the applet resident frame (invisible frame) 121b of the browser 120 of the ATM 1. And when the apparatus is started up, the screen image generation applet (called DispAgent) 125 acquires the button images of the transaction screen, and generates the screen image in advance in the resident frame 121b.

Then according to the transaction operation, the transaction screen content described by HTML/JSP (Java Server Page)/JavaScript is received from the server 100 to communicate with the server 100, the transaction screen is displayed on the UOP 6 by the transaction frame 121a, the applets of the applet (also called Agent) resident frame 121b is called up by the method request instruction in the transaction screen content. The called up applet controls I/O via the ATM middleware 130, and responds with the control result to the transaction screen side via the applets. When the screen control applet (described later in FIG. 24) is downloaded to the transaction frame at this time, the screen image is acquired from the DispAgent (applet) 125 of the resident frame 121b, and the image is drawn.

In other words, as FIG. 10 shows, the screen of the transaction screen frame 121a transits according to the transaction operation, but the applet resident frame 121b does not transit except for the apparatus start up time.

As FIG. 20 shows, the screen content (HTML+JavaScript) 122 and the Agent (applet) 123 are downloaded from the WWW server 100 to the Web browser 120.

The Agent 123 has the control Agent group 124 for controlling each unit, the POSTAgent 126 for performing post-processing, the ViewAgent 128 for constructing a screen, and the communication DLL (Dynamic Link Library) group 129 for communicating with the I/O controller 170 via the Java Native Interface and a common API interface 132. The Agent 123 further has the above mentioned DispAgent 125.

For the control Agent group 124 and the DispAgent 125, the agents required for transaction control are downloaded in advance when the apparatus is started up, and reside in the browser 120. As described for FIG. 21 and later, the control Agent is constructed in the processing units of an ATM transaction.

In the case of the operation of the configuration shown in FIG. 20, the method of the control Agent 124 is called up with the method name described by JavaScript in the screen content 122. The method which was called up issues a command to the I/O controller 170 via the communication DLL group 129.

The I/O controller 170 operates the corresponding units via the ATM middleware 180, and receives the operation completion response. The I/O controller 170 responds with the command execution result to the control Agent 124. The control Agent 124 requests POST or requests drawing to the POST Agent 126, which performs POST processing, or the ViewAgent 128 which updates screens, to have them execute post-processing or screen update processing.

The DispAgent 125 acquires the button images of the downloaded transaction screen, and generates the screen image in advance. Then according to the transaction operation, the screen image is acquired from the DispAgent (applet) 125 of the resident frame 121b, and the image is drawn in the case when the screen control applet is downloaded in the transaction frame of the server 100.

As FIG. 21 shows, in this example, the synchronous Agent has synchronous control initialization, mechanical reset, bill/coin insertion, simultaneous medium eject, print/feed/MS write/eject preparation, deposit return, storage, forced eject/capture, unit information acquisition/transition status setup/two-screen display control, deposit/withdrawal preparation, forced replenishment, jam reset and card/pass book insertion methods.

Each Agent/method issues a command to an I/O controller (that is, I/O unit) indicated by the black dots in FIG. 21, and receives the response of the command execution result. For example, the initialization Agent/method of synchronization control issues the initialization command to the bill controller 175, coin controller 176, pass book controller 171, card controller 172, receipt controller 174, journal controller 177, transaction control controller 178, and numeric keypad controller 173 (see FIG. 5), has each controller execute initialization processing, and receives the initialization processing result from each controller as a response.

In the same way, the mechanical reset Agent/method of synchronous control issues a mechanical reset command to the bill controller 175, coin controller 176, pass book controller 171, card controller 172, receipt controller 174 and journal controller 177 (see FIG. 5), has each controller execute the mechanical reset processing, and receives the mechanical reset processing result from each controller as a response.

In the same way, the bill/coin insertion agent/method of the synchronous control issues an insertion command to the bill controller 175 and coin controller 176 (see FIG. 5), has each controller execute the insertion processing, and receives the insertion processing result from each controller as a response.

The screen control (key control) agent is also disposed, and as applets in screen units thereof, the password number input, amount input, telephone number input, account number input and user/recipient name input are disposed.

Figure 22:
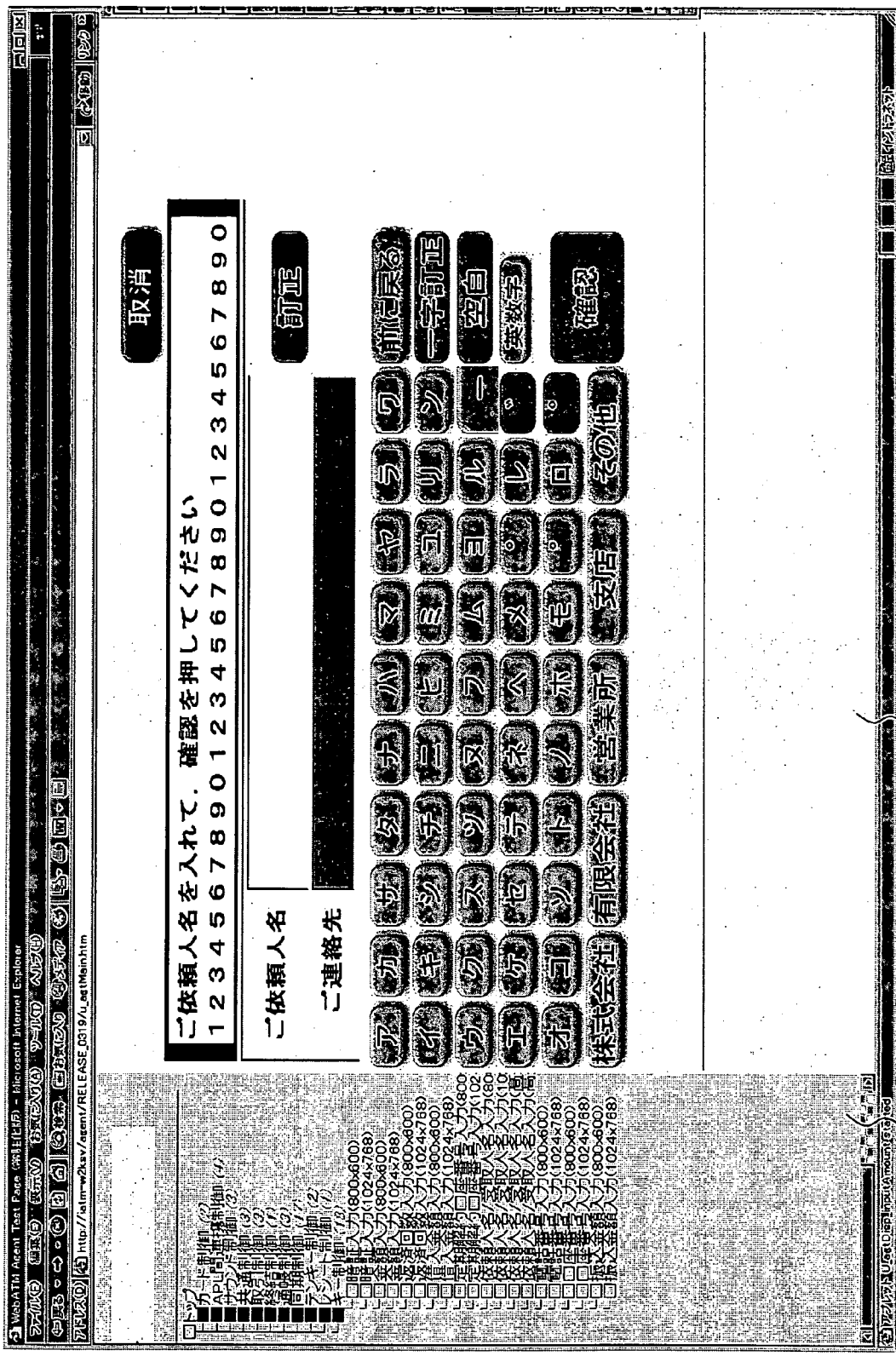
FIG. 22 shows screen image of the transaction frame and resident frame in FIG. 20.
Figure 23:
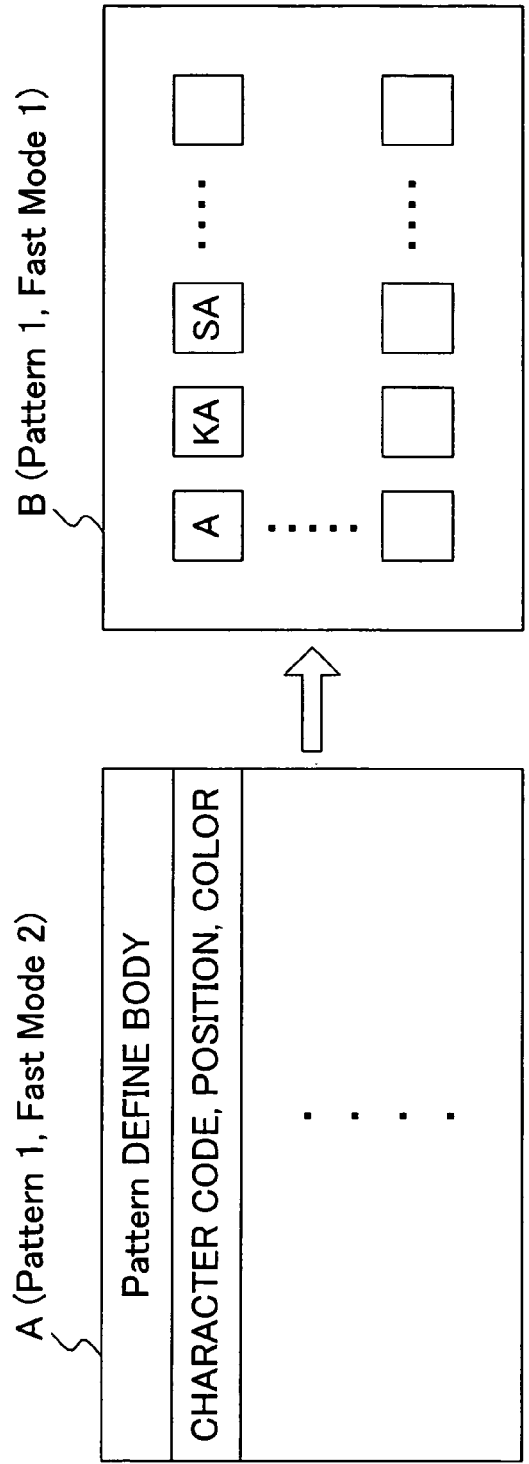
FIG. 23 shows the definition example of the applet download of the resident frame in FIG. 22.

FIG. 22 shows a screen frame according to another embodiment of the present invention. FIG. 23 shows a definition example of DispAgent of the resident frame 121b in FIG. 22, and FIG. 24 shows a definition example of DispAgent callup in the transaction frame in FIG. 24.

FIG. 22 shows an image example of the transaction frame 121a by Japanese language for the user name/recipient name input method of the key control (screen control) agent of the resident frame 121b. As FIG. 23 shows, the user name/recipient name input applet is embedded as a resident in advance. In this example, the user name/recipient name input applet is defined as "agtDisp.U_agtDisp_inputName.class" by the applet tag, and the width and height are set to "0" (non-display). As parameters, the pattern name is specified as "strPatternNo", and the mode is specified as the high-speed mode (strFastMode VALUE="2").

For example, the pattern file A with pattern 1 and high-speed mode 2 is a pattern definition displayed in the transaction frame 121a in FIG. 22, and defines each button image file, storage location, display message, character font, layout position and color. And the image file (pattern 1, high-speed mode 1) B with the button image by Japanese language shown in the transaction frame 121a in FIG. 22 is created in advance by execution (screen image generation (panel and button layout) and button image acquisition/embedding) at the apparatus startup of the DispAgent 125.

When the user name/recipient name input applet at the resident side is called up by the transaction frame 121a, as shown in FIG. 24, the resident screen B is acquired, and the data is displayed. In this example, the user name/recipient name input applet is defined as "agtDisp.U_agtDisp_inputName.class" by the applet tag in the transaction frame 121a as a screen control applet, and the width and height are set to "800" and "600" (display). As parameters, the pattern name is specified as "StrPatternNo"=1, and the mode is specified as the high-speed mode (strFastMode VALUE="1").

Because of this, the pattern file B at the resident side is immediately displayed, as shown in FIG. 22. In this example, the screen image creation applet and the screen control applet have the same applet name, "agtDisp.U_agtDisp_inputName.class", and are distinguished by the parameters (pattern name "strPatternNo"=1) and the mode (strFastModeValue). However another applet name may be used.

Figure 25:
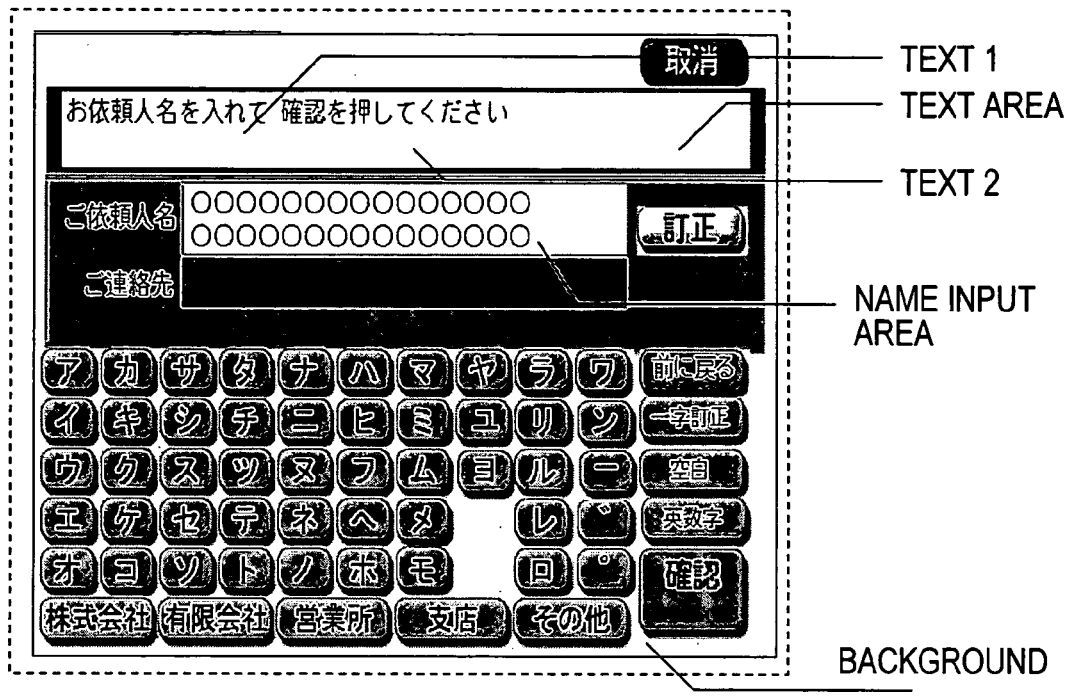
FIG. 25 shows the display view example of the user name input screen of the transaction frame in FIG. 22.
Figure 26:
FIG. 26 shows another display view example of the user name input screen of the transaction frame in FIG. 22.
Figure 27:
FIG. 27 shows still another display view example of the user name input screen of the transaction frame in FIG. 22.

FIG. 25 to FIG. 27 show the user name input screens view by Japanese language. As FIG. 22 to FIG. 25 show, this screen has button images with kana characters of Japanese language, control button images such as "previous", "character correction", "space", "alphanumeric" and "check", and simplified input button images, such as "Inc.". In the same way, another user name input screen in FIG. 26 has button image of alphanumeric characters, control button images, such as "previous", "character correction", "space", "alphanumeric" and "check", and simplified input button images, such as "Inc." by Japanese language. Another user name input screen in FIG. 27 has control button images, such as "previous", "character correction", "space", "alphanumeric" and "check", and simplified input button images, such as "Inc." by Japanese language.

Figure 28:
FIG. 28 shows the display view example of the recipient name input screen of the transaction frame in FIG. 22.
Figure 29:
FIG. 29 shows another display view example of the recipient name input screen of the transaction frame in FIG. 22.
Figure 30:
FIG. 30 shows still another display view example the recipient name input screen of the transaction frame in FIG. 22.
Figure 31:
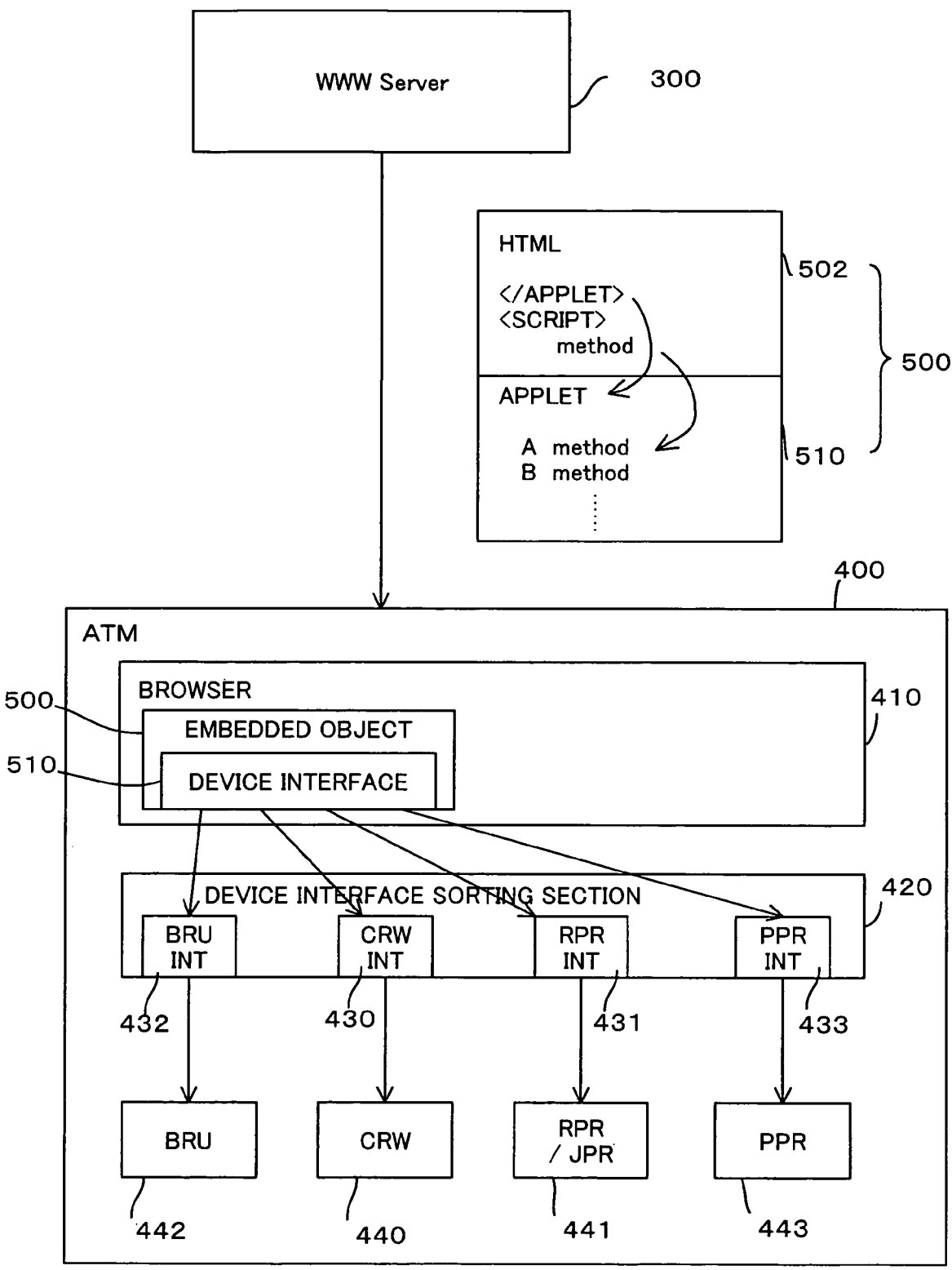
FIG. 31 is a diagram depicting a conventional automatic transaction system by Web control.

FIG. 28 to FIG. 30 are recipient name input screens view by Japanese language. As FIG. 28 shows, this screen has kana character button images, control button images, such as "previous", "character correction", "space", "alphanumeric" and "check", and simplified input button images, such as "Inc." by Japanese language. In the same way, another recipient name input screen in FIG. 29 has button images of alphanumeric characters, control button images, such as "previous", "character correction", "space", "alphanumeric" and "check", and simplified input button images, such as "Inc." by Japanese language. Another recipient name input screen in FIG. 30 has control button images, such as "previous", "character correction", "space", "alphanumeric" and "check", and simplified input button images, such as "Inc." by Japanese language.

In this way, when the apparatus is started up (e.g. at power ON), the screen generation image applet 125, in addition to the control applet, is downloaded and embedded in the applet resident frame (invisible frame) 121b of the browser 120 of the ATM 1 from the server 100. And when the apparatus is started up, the screen image applet (also called DispAgent) 125 acquires the button image of the transaction screen, and generates the screen images in advance in the resident frame 121b.

Then according to the transaction operation, in the case of communicating with the server 100, the transaction screen content described in HTML/JSP (Java Server Page)/JavaScript is received, the transaction screen is displayed on the UOP 6 by the transaction frame 121a, applets of the applet (also called Agent) resident frame 121b are called up by the method request instruction in the transaction screen content, and the I/O is controlled and the control result is responded to the transaction screen side via the applet through the ATM middleware 130. At this time, when the image drawing applet name is downloaded to the transaction frame, the screen image is acquired from the Disp Agent (applet) 125 of the resident frame 121b, and the image is drawn.

Therefore the download time of applets and the download time of button images can be saved when the screen transits, so the screen switching time can be decreased. Even if a complicated pattern is displayed for sensation, the image switching time can be decreased, and this contributes to improving the sensation of the user during operation input.

Other Embodiments

In the above embodiments, the automatic transaction apparatus in FIG. 1 was described using the example of an automatic deposit/withdrawal machine, but the present invention can be applied to other apparatus including a withdrawal machine, automatic cash loan machine and automatic issuing machine. The network was described as the Internet, but the present invention can be applied to other networks, and for the server, the script is not limited to JavaScript, but other scripts can also be used.

Also the middleware control customized by a common API was described as an example, but the present invention can also be used for middleware control without using this common API.

The present invention was described by the embodiments, but the present invention can be varied and modified within the scope of the essential character of the present invention, and these shall not be excluded from the scope of the present invention.

In this way, the screen frame of the browser is divided into the transaction frame and the resident frame, and applets are downloaded from the server to the resident frame of the browser in advance when the apparatus is started up. And during communication with the Web server for screen transition, applets are not transmitted, but a transaction screen, where tags for specifying applets are embedded, is transmitted, so the applet download time at transaction screen transition can be decreased, and the operating efficiency of the device improves.

When the apparatus is started up (e.g. at power ON), the screen image generation applet, in addition to the control applet, is downloaded to and embedded in the applet resident frame, and the screen image generation applet acquires the button images of the transaction screen and generates the screen image in advance. And according to the transaction operation, the transaction screen content is received to communicate with the server, and the screen image is acquired from the resident fame and the image is drawn when the screen control applet is downloaded to the transaction frame.

Therefore the screen display time of the applets and the download time of button images can be decreased when the screen transits, so the screen switching time can be decreased. Also even if a complicated pattern for visual sensation is displayed, the screen switching time can be decreased, which contributes to improving the visual sensation of the user in operation input.

What is claimed is:

1. An automatic service device for communicating with a Web server and performing guide display and service operation according to an operation by a user, comprising:
    a display unit having a touch panel and for displaying a guide operation;
    a plurality of I/O units for performing a service operation; and
    a control unit for controlling a display of the guide operation on a screen of said display unit according to a screen content from said Web server, calling up a control applet and controlling said plurality of I/O units according to a control applet name defined by a script embedded in said screen content, by a browser, and
    wherein said control unit receives a screen image generation applet for generating an image of said guide operation and a control applet for controlling said plurality of I/O units downloaded from said Web server, stores in advance said screen image generation applet and said control applet in a resident frame of a browser screen, that is divided into a service screen frame and the resident frame and generates an image file for displaying input buttons according to said screen image generation applet, and
    said control unit, when receiving the screen content indicating that said script embedded in said screen content designates said screen image generation applet, acquires said image file for displaying input buttons and displays said image file on said screen of said display for an input operation of said user, and
    wherein said control unit notifies a start of the automatic service device by a power on of the automatic service device to the Web server, receives the screen image generation applet that is sent from the Web server in response to a notification of the start and generates said image file for displaying on said service screen frame by said screen image generation applet before the user starts the operation.

2. The automatic service device according to claim 1, wherein said control unit sets said service screen frame to display and said resident frame to non-display depending on a frame control content from said Web server.

3. The automatic service device according to claim 1, wherein said control unit comprises a browser which interprets said screen content and performs said guide operation display, interprets said script embedded in said screen content and calls up a method in processing units of a transaction operation for synchronously controlling said plurality of I/O units, and
    wherein said control unit synchronously controls said plurality of I/O units from said browser.

4. The automatic service device according to claim 1, wherein said browser of said control unit allows screen of said service screen frame to transit according to the screen content from said Web server, and inhibit said resident frame to transit except for a startup time.

5. The automatic service device according to claim 1, wherein said plurality of I/O units comprises at least:
    a cash processing unit; and
    a card processing unit.

6. The automatic service device according to claim 1, wherein said screen image generation applet creates said image file which is arranged from multiple button images defined in a pattern definition file.

7. An automatic service system comprising:
    a Web server; and
    an automatic service device which is connected to said Web server via a network for communicating with said Web server and performing guide operation display and service operation according to the operation by a user,
    wherein said automatic service device comprises:
    a display unit having a touch panel and for displaying a guide operation;
    a plurality of I/O units for performing said service operation; and
    a control unit for controlling a display of the guide operation on a screen of said display unit according to a screen content from said Web server, calling up a control applet and controlling said plurality of I/O units according to a control applet name defined by a script embedded in said screen content, by a browser, and
    wherein said control unit receives a screen image generation applet for generating an image of said guide operation and a control applet for controlling said plurality of I/O units downloaded from said Web server and stores in advance said screen image generation applet and said control applet in a resident frame of a browser screen, that is divided into a service screen frame and said resident frame and generates an image file for displaying input buttons according to said screen image generation applet, and
    said control unit, when receiving the screen content indicating that said script embedded in said screen content designates said screen image generation applet, acquires said image file for displaying input buttons and displays said image file on said screen of said display for an input operation of said user, and
    wherein said control unit notifies a start of the automatic service device by a power on of the automatic service device to the Web server, receives the screen image generation applet that is sent from the Web server in response to a notification of the start and generates said image file for displaying on said service screen frame by said screen image generation applet before the user starts the operation.

8. The automatic service system according to claim 7, wherein said control unit sets said service screen frame to display and said resident frame to non-display depending on a frame control content from said Web server.

9. The automatic service system according to claim 7, wherein said control unit comprises a browser which interprets said screen content and performs said guide operation display, interprets said script embedded in said screen content and calls up a method in processing units of a transaction operation for synchronously controlling said plurality of I/O unit, and
  wherein said control unit synchronously controls said plurality of I/O units from said browser.

10. The automatic service system according to claim 7, wherein said browser of said control unit allows screen of said service screen frame to transit according to the screen content from said Web server, and inhibits said resident frame to transit except for a startup time.

11. The automatic service system according to claim 7, wherein said plurality of I/O units comprises at least:
  a cash processing unit; and
  a card processing unit.

12. The automatic service system according to claim 7, wherein said screen image generation applet creates said image file which is arranged a plurality of said button image, from multiple button images defined in a pattern definition file.

13. An automatic service method, comprising:
  notifying a start of an automatic service device by a power on of the automatic service device to a Web server;
  receiving a screen image generation applet for generating an image of a guide operation and a control applet for controlling a plurality of I/O units by the automatic service device downloaded from the Web server in response to a notification of the start;
  storing in advance said screen image generation applet and said control applet a resident frame of a browser screen, that is divided into a service screen frame and said resident frame, of said automatic service device;
  generating an image file for displaying input buttons according to said screen image generation applet before an user starts an operation;
  performing a display of the guide operation by a screen content from said Web server; and
  calling up said control applet and controlling said I/O unit according to a control applet name defined by a script embedded in said screen content,
  said performing including:
  acquiring, when said script embedded in said screen content designates said screen image generation applet, said image file for displaying input buttons; and displaying said image file on said screen of said display for an input operation of the user.

14. The automatic service method according to claim 13, comprising:
  setting the service screen frame to display and said resident frame to non-display depending on a frame control content from said Web server.

15. The automatic service method according to claim 13, wherein said calling up comprises:
  interpreting said script embedded in said screen content and performing said display of guide operation,
  calling up a method in processing units of a transaction operation for synchronously controlling said plurality of I/O units, and
  synchronously controlling said plurality of I/O units.

16. The automatic service method according to claim 13, wherein said performing of the display of the guide operation comprises allowing the screen of said service screen frame to transit according to the screen content from said Web server, and inhibiting said resident frame to transit except for a startup time.

17. The automatic service method according to claim 13, wherein said calling up comprises controlling an I/O unit which has at least a cash processing unit and a card processing unit.

18. The automatic service method according to claim 13, wherein said generation comprises creating said image file which is arranged from multiple button images of a pattern definition file.

19. The automatic service method according to claim 13, wherein said calling of the control applet is implemented without requiring downloading to be triggered and said displaying of the image file specifies a corresponding applet to the screen to cause said display for the input operation of the user.

20. An automatic service device for communicating with a Web server and performing guide display and service operation according to an operation by a user, comprising:
  a display unit having a touch panel and displaying a guide operation;
  a plurality of I/O units for performing a service operation; and
  a control unit for controlling a display of the guide operation on a screen of said display unit according to a screen content from said Web server, calling up a control applet and controlling said I/O units according to a control applet tag defined by a script embedded in said screen content, by a browser, and
  wherein said control unit notifies a start of the automatic service device by a power on of the automatic service device to the Web server, receives a screen image generation applet for generating an image of said guide operation and a control applet for controlling said plurality of I/O units downloaded from said Web server in response to the start, stores in advance said screen image generation applet and said control applet in a resident frame of a browser screen, that is divided into a service screen frame and the resident frame and generates an image file for displaying input buttons according to said screen image generation applet before the user starts the operation, and
  said control unit, when receiving the screen content indicating that said script embedded in said screen content designates said screen image generation applet, acquires said image file for displaying input buttons and displays said image file on said screen of said display for an input operation of said user.

21. The automatic service device according to claim 20, where an applet related to the screen content is specified from among applets downloaded in advance that reside in the browser, without requiring transmission of the applet upon the input operation of said user, and the image file is displayed in accordance with the specified applet.

* * * * *

UNITED STATES PATENT AND TRADEMARK OFFICE
CERTIFICATE OF CORRECTION

| | | |
|---|---|---|
| PATENT NO. | : 8,090,804 B2 | Page 1 of 1 |
| APPLICATION NO. | : 11/103450 | |
| DATED | : January 3, 2012 | |
| INVENTOR(S) | : Tomomichi Obara et al. | |

It is certified that error appears in the above-identified patent and that said Letters Patent is hereby corrected as shown below:

In the Claims:
Column 21, Line 18, In Claim 12, delete "arranged a" and insert -- arranged in a --, therefor.

Signed and Sealed this
Seventeenth Day of April, 2012

David J. Kappos
*Director of the United States Patent and Trademark Office*